US012647778B2

(12) United States Patent
Elshafie et al.

(10) Patent No.: US 12,647,778 B2
(45) Date of Patent: Jun. 2, 2026

(54) REFERENCE SIGNAL SECURITY TO COMBAT EAVESDROPPING AND DIRECTIONAL DENIAL OF SERVICE ATTACKS

(71) Applicant: QUALCOMM Incorporated, San Diego, CA (US)

(72) Inventors: Ahmed Elshafie, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 18/580,883

(22) PCT Filed: Aug. 22, 2022

(86) PCT No.: PCT/US2022/040996
§ 371 (c)(1),
(2) Date: Jan. 19, 2024

(87) PCT Pub. No.: WO2023/038780
PCT Pub. Date: Mar. 16, 2023

(65) Prior Publication Data
US 2024/0340640 A1     Oct. 10, 2024

(30) Foreign Application Priority Data
Sep. 13, 2021    (GR) .............................. 20210100601

(51) Int. Cl.
*H04W 12/037* (2021.01)
*H04L 5/00* (2006.01)

(52) U.S. Cl.
CPC ......... *H04W 12/037* (2021.01); *H04L 5/0051* (2013.01)

(58) Field of Classification Search
CPC .............. H04W 12/037; H04W 12/122; H04L 5/0051; H04L 9/0656; H04L 2209/08; H04L 2209/80; H04L 63/1458
See application file for complete search history.

(56) References Cited

U.S. PATENT DOCUMENTS

2010/0195532 A1* 8/2010 Pajukoski ................. H04L 5/06
                                                                370/254
2010/0215114 A1* 8/2010 Kim ...................... H04L 5/0048
                                                                375/267

(Continued)

FOREIGN PATENT DOCUMENTS

EP          3487203 A1    5/2019
EP          3487203 B1 * 12/2020   ......... H04B 7/06966
WO    WO-2021061352 A1    4/2021

OTHER PUBLICATIONS

Zhen et al., "Sounding Reference Signal Based Timing Advance Adjustment for LTE-Satellite Mobile Communication Systems", Nov. 2016, 19th International Symposium on Wireless Personal Multimedia Communications, pp. 287-289 (Year: 2016).*

(Continued)

*Primary Examiner* — Kenneth W Chang
(74) *Attorney, Agent, or Firm* — Holland & Hart LLP/Qualcomm

(57) ABSTRACT

Methods, systems, and devices for wireless communications are described. A first wireless device may receive, from a second wireless device, an indication of one or more parameters associated with a reference signal that is to be transmitted by the first wireless device. The one or more parameters may be encoded separately from the remainder of the control message using a secret key that is known to both the second wireless device and the first wireless device. The first wireless device may then decode the one or more parameters using the secret key, and may transmit the associated refer- (Continued)

ence signal to the second wireless device based on decoding
the parameters using the secret key.

30 Claims, 20 Drawing Sheets

(56)                    References Cited

U.S. PATENT DOCUMENTS

| | | | |
|---|---|---|---|
| 2012/0082124 A1* | 4/2012 | Kwon | H04L 5/0007 |
| | | | 370/329 |
| 2015/0011224 A1* | 1/2015 | Kompalli Chakravartula | ............. |
| | | | H04W 36/00837 |
| | | | 455/438 |
| 2016/0065362 A1* | 3/2016 | Choyi | H04L 63/065 |
| | | | 380/279 |
| 2016/0112960 A1* | 4/2016 | Park | H04W 52/325 |
| | | | 370/329 |
| 2017/0126411 A1* | 5/2017 | Piqueras Jover | H04L 9/3247 |
| 2018/0160467 A1* | 6/2018 | Quan | H04W 12/10 |
| 2019/0149307 A1* | 5/2019 | Siomina | H04B 17/318 |
| | | | 370/252 |
| 2020/0145821 A1* | 5/2020 | Lee | H04W 48/12 |
| 2020/0322805 A1 | 10/2020 | Wang et al. | |

OTHER PUBLICATIONS

International Search Report and Written Opinion—PCT/US2022/
040996—ISA/EPO—May 12, 2022 (2104976WO).

* cited by examiner

405 — Control Message

Reference Signal Parameters encoded using secret key ~410

Decode one or more parameters using secret key ~415

Reference Signal
420

400

510

520

515

505

500

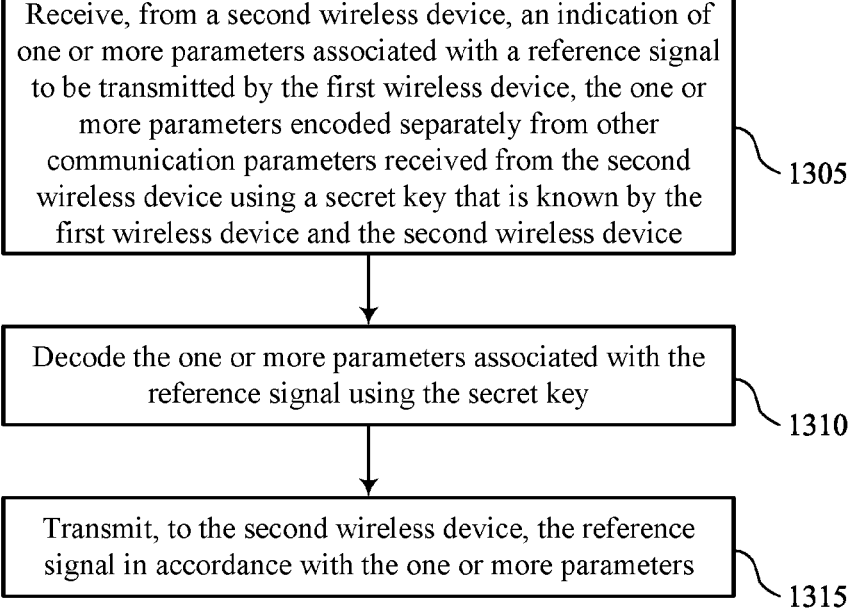

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1305

Decode the one or more parameters associated with the reference signal using the secret key

1310

Transmit, to the second wireless device, the reference signal in accordance with the one or more parameters

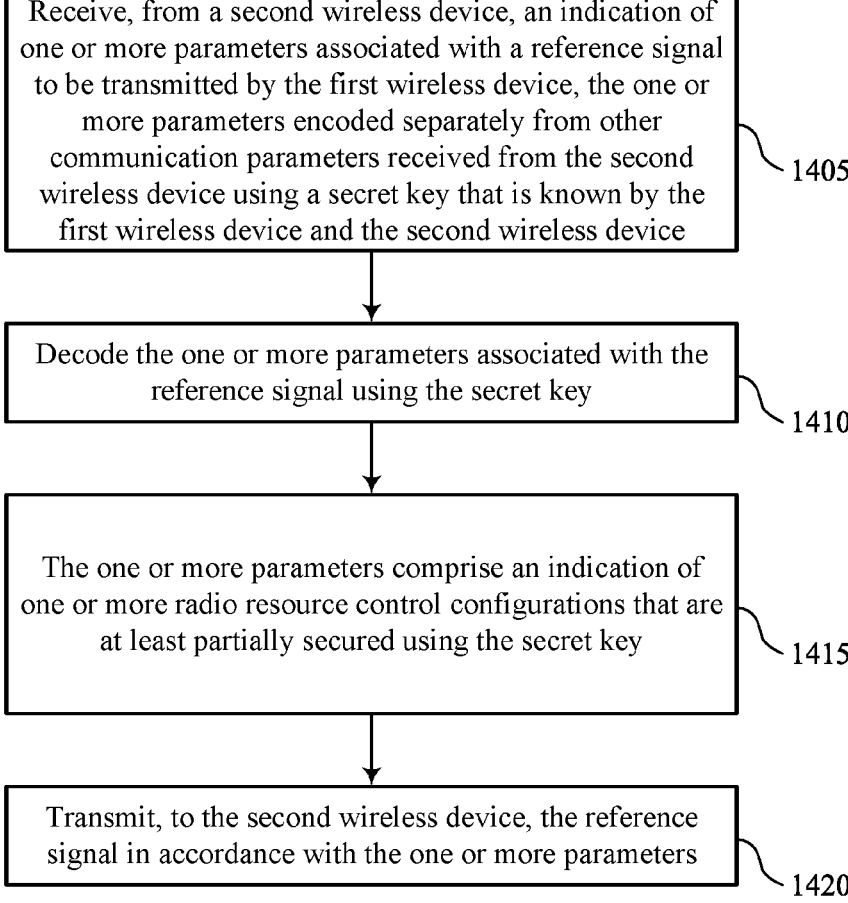

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1405

Decode the one or more parameters associated with the reference signal using the secret key

1410

The one or more parameters comprise an indication of one or more radio resource control configurations that are at least partially secured using the secret key

1415

Transmit, to the second wireless device, the reference signal in accordance with the one or more parameters

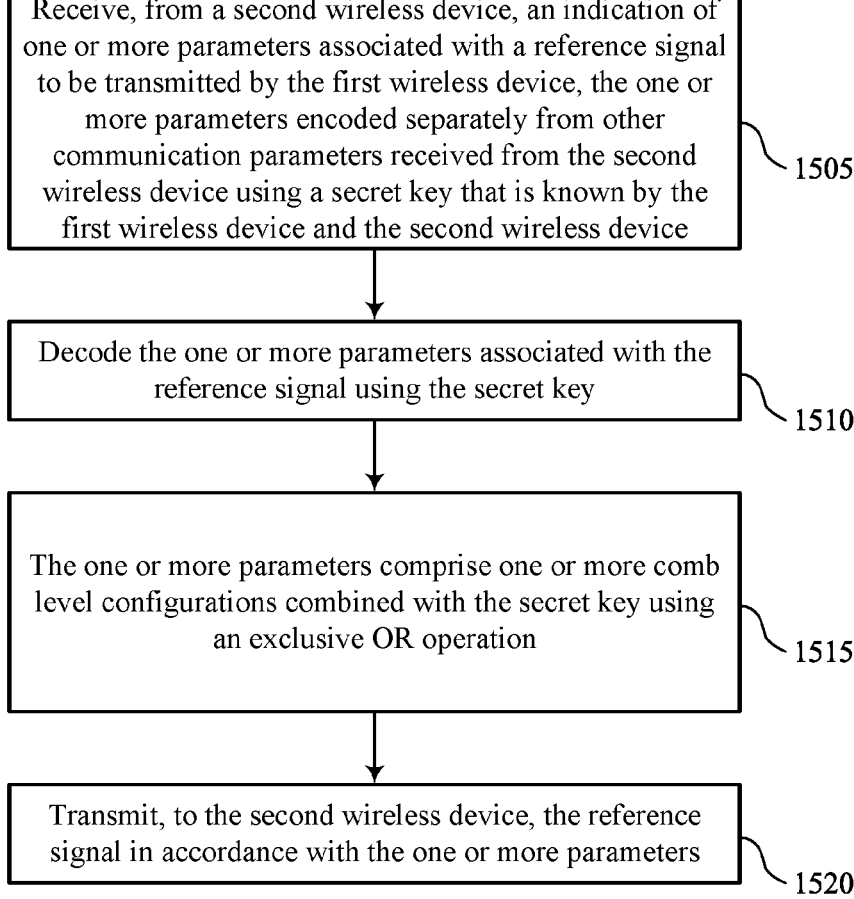

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1505

Decode the one or more parameters associated with the reference signal using the secret key

1510

The one or more parameters comprise one or more comb level configurations combined with the secret key using an exclusive OR operation

1515

Transmit, to the second wireless device, the reference signal in accordance with the one or more parameters

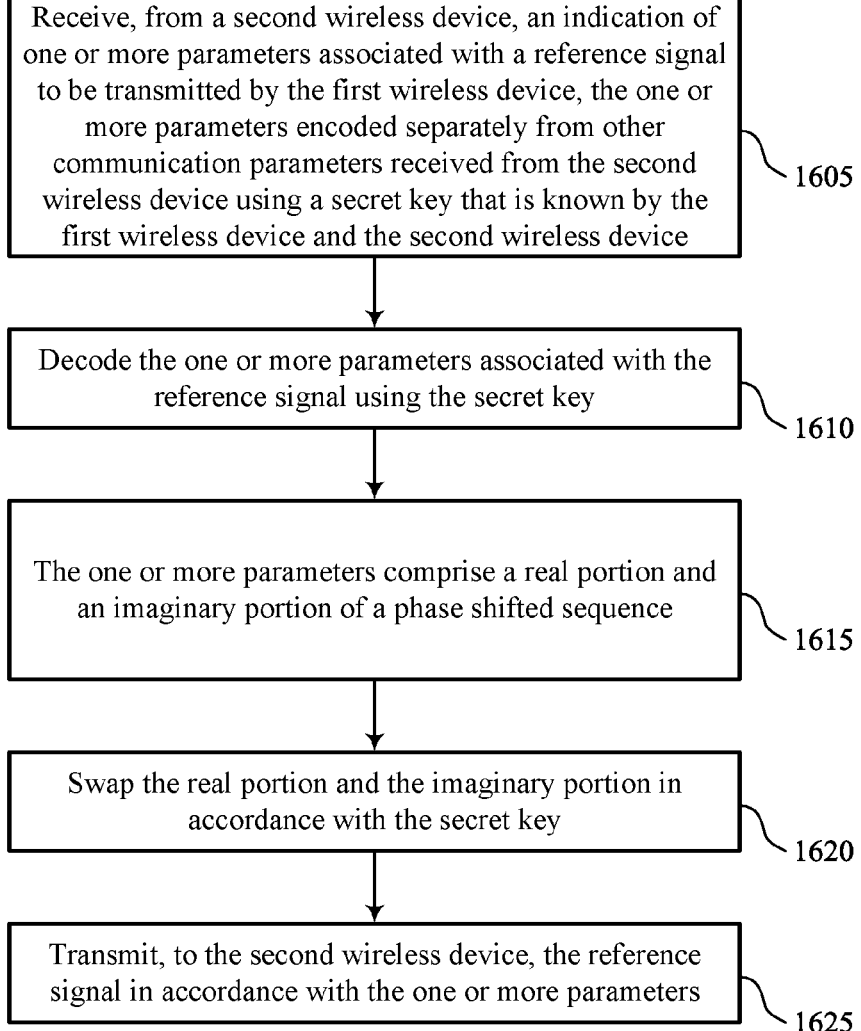

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1605

Decode the one or more parameters associated with the reference signal using the secret key

1610

The one or more parameters comprise a real portion and an imaginary portion of a phase shifted sequence

1615

Swap the real portion and the imaginary portion in accordance with the secret key

1620

Transmit, to the second wireless device, the reference signal in accordance with the one or more parameters

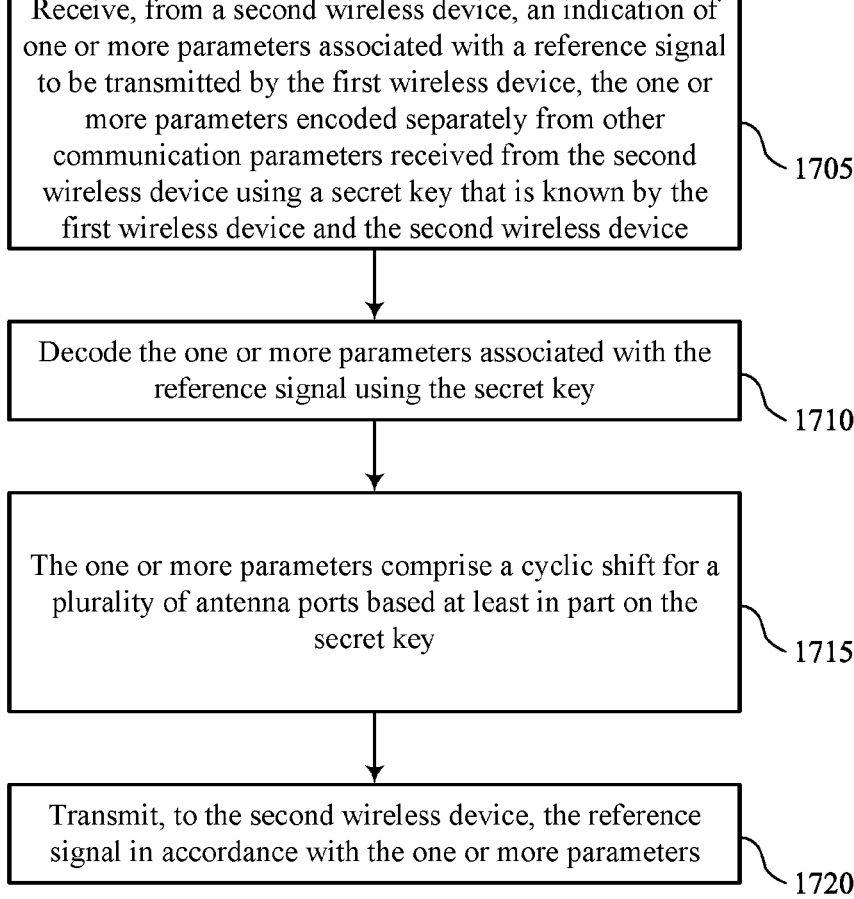

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1705

Decode the one or more parameters associated with the reference signal using the secret key

1710

The one or more parameters comprise a cyclic shift for a plurality of antenna ports based at least in part on the secret key

1715

Transmit, to the second wireless device, the reference signal in accordance with the one or more parameters

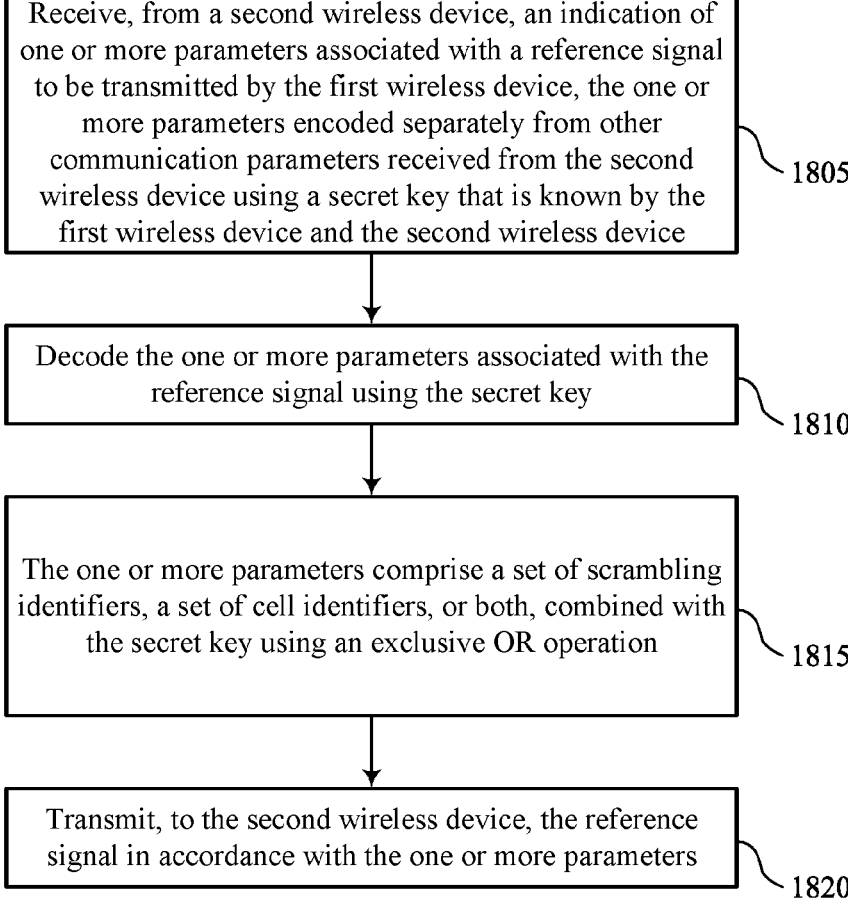

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1805

Decode the one or more parameters associated with the reference signal using the secret key

1810

The one or more parameters comprise a set of scrambling identifiers, a set of cell identifiers, or both, combined with the secret key using an exclusive OR operation

1815

Transmit, to the second wireless device, the reference signal in accordance with the one or more parameters

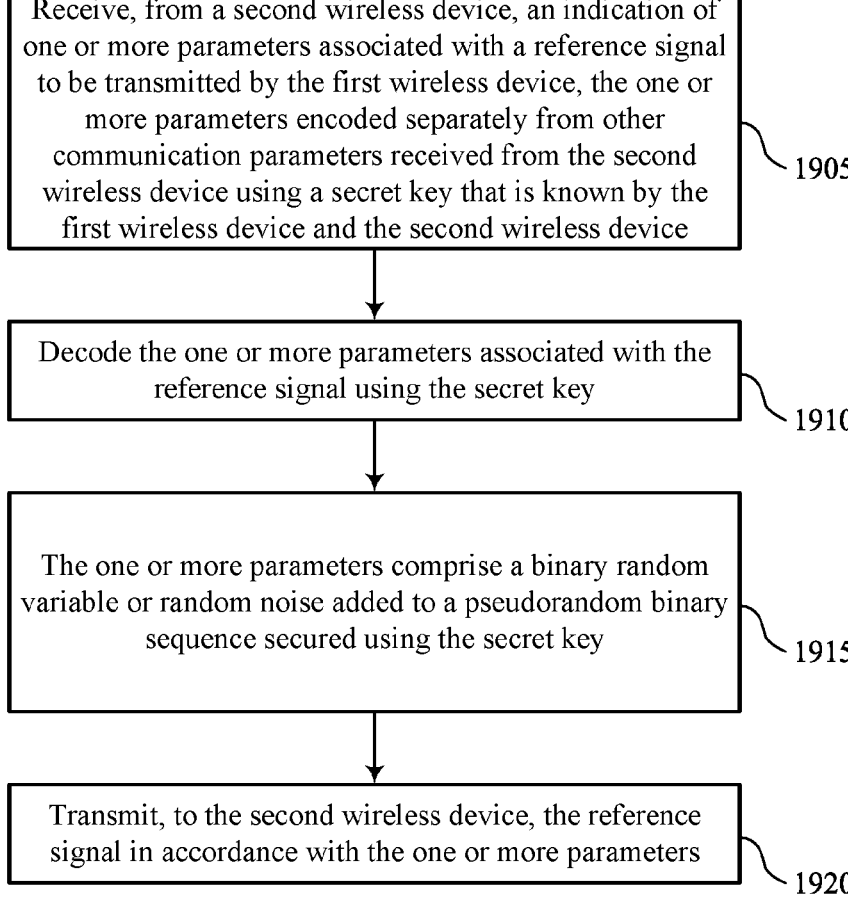

Receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device

1905

Decode the one or more parameters associated with the reference signal using the secret key

1910

The one or more parameters comprise a binary random variable or random noise added to a pseudorandom binary sequence secured using the secret key

1915

Transmit, to the second wireless device, the reference signal in accordance with the one or more parameters

Figure 20:
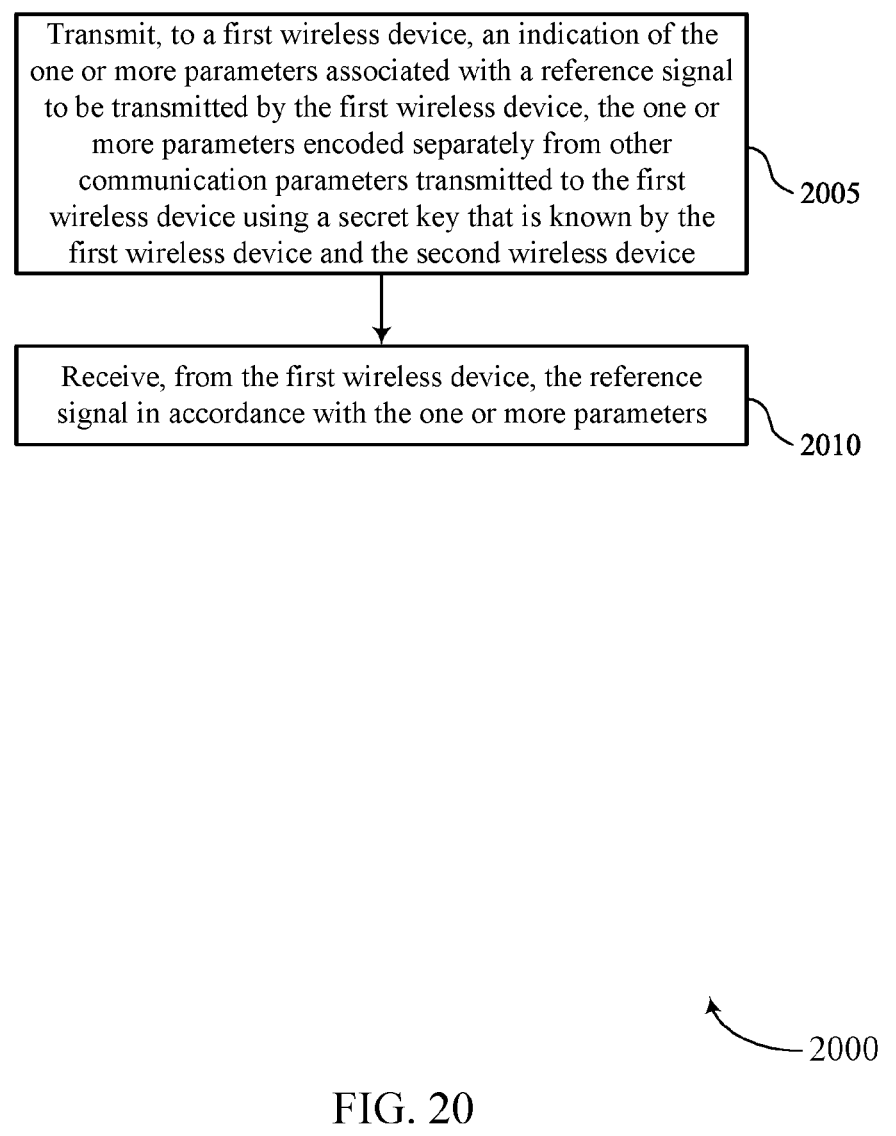

Transmit, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device

2005

Receive, from the first wireless device, the reference signal in accordance with the one or more parameters

REFERENCE SIGNAL SECURITY TO COMBAT EAVESDROPPING AND DIRECTIONAL DENIAL OF SERVICE ATTACKS

CROSS REFERENCE

The present Application is a 371 national stage filing of International PCT Application No. PCT/US2022/040996 by ELSHAFIE et al. entitled "REFERENCE SIGNAL SECURITY TO COMBAT EAVESDROPPING AND DIRECTIONAL DENIAL OF SERVICE ATTACKS," filed Aug. 22, 2022; and claims priority to Greece Patent Application No. 20210100601 by ELSHAFIE et al., entitled "REFERENCE SIGNAL SECURITY TO COMBAT EAVESDROPPING AND DIRECTIONAL DENIAL OF SERVICE ATTACKS," filed Sep. 13, 2021, each of which is assigned to the assignee hereof, and each of which is expressly incorporated by reference in its entirety herein.

FIELD OF TECHNOLOGY

The following relates to wireless communications, including reference signal security to combat eavesdropping and directional denial of service attacks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may employ the use of cryptographic or secret keys to secure communications between devices and reduce the number of eavesdropping and other denial-of-service (DOS) attacks. Additional techniques to enhance communications security may be desired.

SUMMARY

The described techniques relate to improved methods, systems, devices, and apparatuses that support reference signal security to combat eavesdropping and directional denial of service attacks. Generally, the described techniques provide for enhanced security for reference signal transmissions. In some wireless communications networks, high signaling rates between devices may increase the likelihood of eavesdropping and other denial of service (DOS) attacks. To increase security and reduce the number of successful attacks, wireless devices such as a base station and a UE may use symmetric key encryption to encrypt various signaling parameters (e.g., reference signal parameters) to increase the security of transmissions in the network. For example, the base station may transmit a control message which includes an indication of the reference signal parameters that are encoded using a secret key that is known to both the base station and the UE. The UE may decode the reference signal parameters using the secret key, and may transmit an associated reference signal (e.g., a sounding reference signal (SRS), a demodulation reference signal (DMRS), a channel state information reference signal (CSI-RS), or a combination thereof) based on decoding the reference signal parameters using the secret key.

A method for wireless communications at a first wireless device is described. The method may include receiving, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device, decoding the one or more parameters associated with the reference signal using the secret key, and transmitting, to the second wireless device, the reference signal in accordance with the one or more parameters.

An apparatus for wireless communications at a first wireless device is described. The apparatus may include a processor, memory coupled with the processor, and instructions stored in the memory. The instructions may be executable by the processor to cause the apparatus to receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device, decode the one or more parameters associated with the reference signal using the secret key, and transmit, to the second wireless device, the reference signal in accordance with the one or more parameters.

Another apparatus for wireless communications at a first wireless device is described. The apparatus may include means for receiving, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device, means for decoding the one or more parameters associated with the reference signal using the secret key, and means for transmitting, to the second wireless device, the reference signal in accordance with the one or more parameters.

A non-transitory computer-readable medium storing code for wireless communications at a first wireless device is described. The code may include instructions executable by a processor to receive, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device, decode the one or more parameters associated with the reference signal using the secret key, and transmit, to the second wireless device, the reference signal in accordance with the one or more parameters.

In some examples of the method, apparatuses, and non-transitory computer-readable medium described herein, the reference signal includes a SRS and the one or more parameters of the SRS, and the one or more parameters include a SRS sequence identifier secured using the secret key.

In some examples of the method, apparatuses, and non-transitory computer-readable medium described herein, the secret key may be added to the SRS sequence identifier in a decimal domain or may be added to a binary format of the SRS sequence identifier in a binary domain.

In some examples of the method, apparatuses, and non-transitory computer-readable medium described herein, the reference signal includes a SRS and the one or more parameters include one or more spatial relation parameters secured using the secret key, the one or more spatial relation parameters being associated with a spatial relation between the SRS and one of a synchronization signal block, a broadcast channel block, a channel state information reference signal, or another SRS.

In some examples of the method, apparatuses, and non-transitory computer-readable medium described herein, the reference signal includes a SRS, and the one or more parameters include an indication of one or more radio resource control (RRC) configurations that may be at least partially secured using the secret key.

In some examples of the method, apparatuses, and non-transitory computer-readable medium described herein, each of the one or more RRC configurations include a bandwidth configuration parameter, a cyclic shift parameter, a SRS indexing configuration, a transmission comb configuration, or a combination thereof.

In some examples of the method, apparatuses, and non-transitory computer-readable medium described herein, the one or more RRC configurations include a false bandwidth configuration parameter, and application of the secret key to the false bandwidth configuration parameter yields a true bandwidth configuration parameter.

In some examples of the method, apparatuses, and non-transitory computer-readable medium described herein, the reference signal includes a SRS and the one or more parameters include one or more comb level configurations combined with the secret key using an XOR operation.

In some examples of the method, apparatuses, and non-transitory computer-readable medium described herein, the one or more comb level configurations include at least a first comb configuration and a second comb configuration, and the first comb level configuration may be secured using the secret key and applying the XOR operation to the first comb level configuration results in the second comb level configuration.

In some examples of the method, apparatuses, and non-transitory computer-readable medium described herein, the reference signal includes a SRS, and the one or more parameters include a real portion and an imaginary portion of a phase shifted sequence and swapping the real portion and the imaginary portion in accordance with the secret key.

In some examples of the method, apparatuses, and non-transitory computer-readable medium described herein, the reference signal includes a SRS and the one or more parameters include an amplitude scaling factor secured based on the secret key.

In some examples of the method, apparatuses, and non-transitory computer-readable medium described herein, the reference signal includes a SRS and the one or more parameters include a phase shift of a channel phase generated based on the secret key, the phase shift being a ramp in frequency, a set of random phases generated using the secret key, or both.

In some examples of the method, apparatuses, and non-transitory computer-readable medium described herein, the reference signal includes a SRS and the one or more parameters include a cyclic shift for a set of multiple antenna ports based on the secret key.

In some examples of the method, apparatuses, and non-transitory computer-readable medium described herein, the cyclic shift may be applied per antenna port of the set of multiple antenna ports based on the secret key.

In some examples of the method, apparatuses, and non-transitory computer-readable medium described herein, the reference signal includes a SRS and the one or more parameters include a set of sequence identity parameters secured using the secret key.

In some examples of the method, apparatuses, and non-transitory computer-readable medium described herein, the set of sequence identity parameters include at least a first sequence identity parameters and a second sequence identity parameters, and the first sequence identity parameter may be secured using the secret key and applying an XOR operation to the first sequence identity parameter results in the second sequence identity parameter.

In some examples of the method, apparatuses, and non-transitory computer-readable medium described herein, the reference signal includes a SRS and the one or more parameters include a frequency hopping identification parameter secured using the secret key.

In some examples of the method, apparatuses, and non-transitory computer-readable medium described herein, the reference signal includes a SRS and the one or more parameters include one or more time offset parameters secured using the secret key.

In some examples of the method, apparatuses, and non-transitory computer-readable medium described herein, the reference signal includes a SRS and the one or more parameters include a set of one or more base sequence group numbers combined with the secret key using an XOR operation.

In some examples of the method, apparatuses, and non-transitory computer-readable medium described herein, the set of one or more base sequence group numbers include at least a first base sequence group number and a second base sequence group number, and the first base sequence group number may be secured using the secret key and applying the XOR operation to the first base sequence group number results in the second base sequence group number.

In some examples of the method, apparatuses, and non-transitory computer-readable medium described herein, the reference signal includes a DMRS and the one or more parameters include a set of scrambling identifiers, a set of cell identifiers, or both, combined with the secret key using an XOR operation.

In some examples of the method, apparatuses, and non-transitory computer-readable medium described herein, the reference signal includes a DMRS and the one or more parameters include an initialization value for generating a pseudorandom binary sequence secured using the secret key.

In some examples of the method, apparatuses, and non-transitory computer-readable medium described herein, the reference signal includes a DMRS and the one or more parameters include a binary random variable or random noise added to a pseudorandom binary sequence secured using the secret key.

In some examples of the method, apparatuses, and non-transitory computer-readable medium described herein, the reference signal includes a DMRS and the one or more parameters include a generation function for a phase shifted sequence secured using the secret key.

Some examples of the method, apparatuses, and non-transitory computer-readable medium described herein may further include operations, features, means, or instructions for securing the generation function includes swapping a real portion of the generation function and an imaginary portion of the generation function in accordance with the secret key, multiplying the generation function based on the secret key, adding complex random values or random noise based on the secret key, or any combination thereof.

Some examples of the method, apparatuses, and non-transitory computer-readable medium described herein may further include operations, features, means, or instructions for receiving, from the second wireless device, a CSI-RS that may be secured using the secret key, decoding the CSI-RS in accordance with the secret key, and performing one or more channel state information measurements based on the decoding of the secured CSI-RS.

A method for wireless communications at a second wireless device is described. The method may include transmitting, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device and receiving, from the first wireless device, the reference signal in accordance with the one or more parameters.

An apparatus for wireless communications at a second wireless device is described. The apparatus may include a processor, memory coupled with the processor, and instructions stored in the memory. The instructions may be executable by the processor to cause the apparatus to transmit, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device and receive, from the first wireless device, the reference signal in accordance with the one or more parameters.

Another apparatus for wireless communications at a second wireless device is described. The apparatus may include means for transmitting, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device and means for receiving, from the first wireless device, the reference signal in accordance with the one or more parameters.

A non-transitory computer-readable medium storing code for wireless communications at a second wireless device is described. The code may include instructions executable by a processor to transmit, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device and receive, from the first wireless device, the reference signal in accordance with the one or more parameters.

Some examples of the method, apparatuses, and non-transitory computer-readable medium described herein may further include operations, features, means, or instructions for transmitting, to the first wireless device, a channel state information reference signal, where at least a portion of the channel state information reference signal may be secured based on a set of multiple associated spatial parameters secured using the secret key.

BRIEF DESCRIPTION OF THE DRAWINGS

FIGS. 13 through 20 show flowcharts illustrating methods that support reference signal security to combat eavesdropping and directional denial of service attacks in accordance with aspects of the present disclosure.

DETAILED DESCRIPTION

Figure 1:
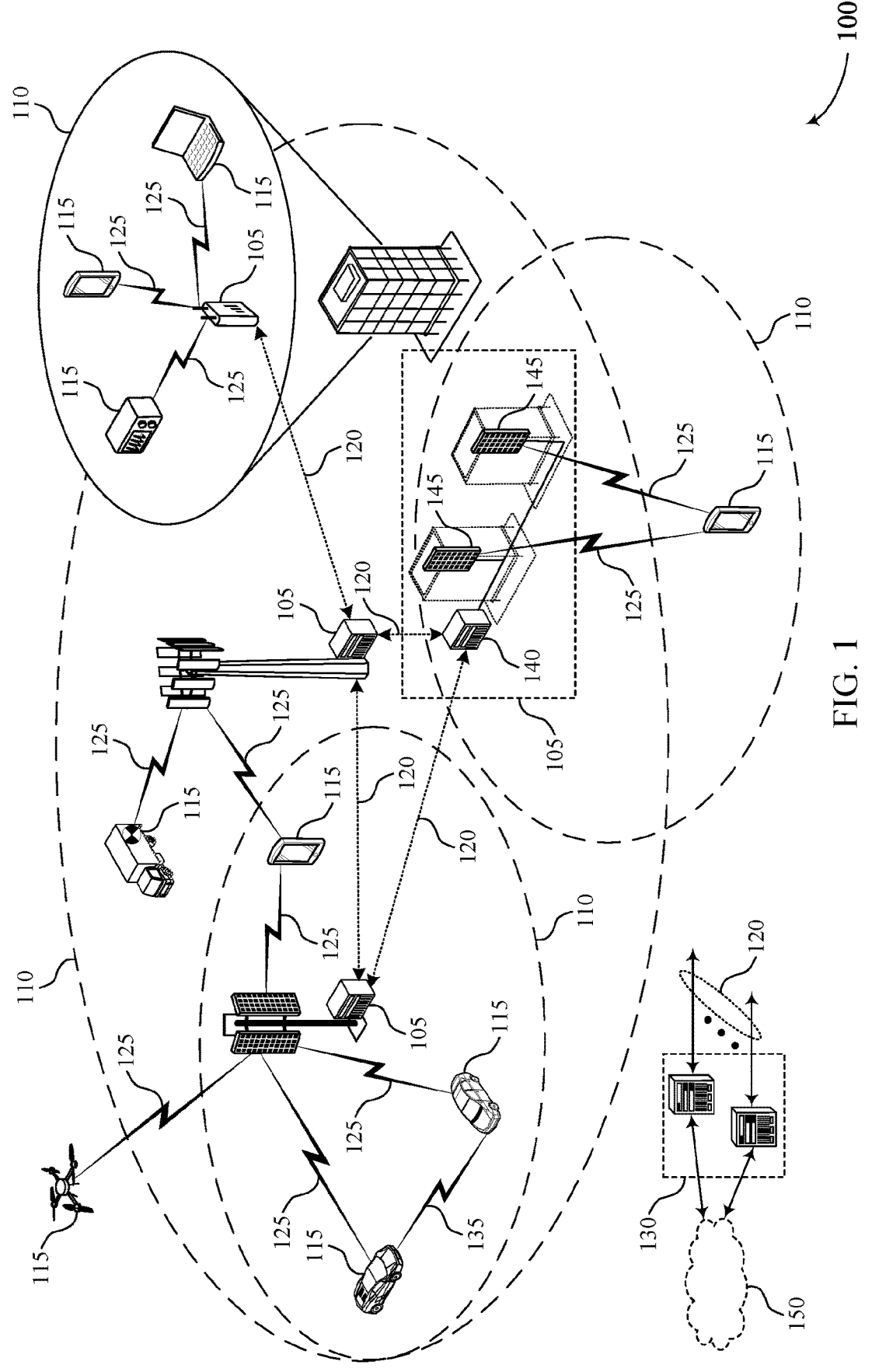
FIGS. 1-3 illustrate examples of a wireless communications systems that support reference signal security to combat eavesdropping and directional denial of service attacks in accordance with aspects of the present disclosure.

In some wireless communications networks, for example, in an industrial internet of things (IoT) deployment or other environments in which numerous devices are connected to one another, the likelihood of eavesdropping and other denial of service attacks increases. Thus, to reduce the number of successful attacks, wireless devices within the network may employ a number of enhanced securely mechanisms to secure communications between devices. One such enhanced security mechanism includes the use of cryptographic keys to protect communications between wireless devices. For example, wireless devices such as a base station and a user equipment (UE) may implement symmetric key encryption such that transmissions of data may be encrypted using a secret key that is known to both of the wireless devices. Upon receiving the transmission, the base station or the UE may securely decrypt the message using the secret key.

The techniques described herein relate generally to the application of secret key encryption to secure reference signaling between wireless devices. For example, transmissions of sounding reference signals (SRS) may be secured by applying the secret key to one or more parameters associated with the SRS. In some examples, the secret key may be added to a SRS sequence identifier, to various spatial relation parameters, frequency hopping parameters, or time offset parameters associated with the SRS. In some other examples, the secret key may be added to secure or randomize a set of radio resource control (RRC) configurations associated with the SRS, or the secret key may be used as part of an exclusive-OR (XOR) operation applied to comb-level configurations or other SRS identifiers. Additionally or alternatively, the SRS sequence or SRS sequence generation parameters may be multiplied by the secret key, or the secret key may be used to introduce a phase shift or cyclic shift to antenna ports associated with the SRS transmission.

The secret key may also be applied to transmissions of a demodulation reference signal (DMRS) to increase the security of the DMRS. For example, the secret key may be XORed with different scrambling identifiers or cell identifiers of the DMRS. In some other examples, the secret key may be added to an initialization value for generating a binary sequence for the DMRS, or the secret key may be multiplied by the generation sequence to introduce a phase shift based on the secret key.

Additionally or alternatively, techniques using the secret key may be used to secure transmissions of channel state information reference signals (CSI-RS) or a number of other reference signals. Application of the secret key to reference signal transmissions may enhance security and reliability of communications between devices in the wireless communications network, and may decrease the number of successful DOS attacks by potential eavesdropping devices. Aspects of the disclosure are initially described in the context of wireless communications systems. Aspects of the disclosure are further illustrated by and described with reference to apparatus diagrams, system diagrams, a process flow, and flowcharts that relate to reference signal security to combat eavesdropping and directional denial of service attacks.

FIG. 1 illustrates an example of a wireless communications system 100 that supports reference signal security to combat eavesdropping and directional denial of service attacks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications networks, for example, wireless communications system 100, the large number of communications between devices may increase the likelihood of eavesdropping and other denial of service attacks. Thus, to increase security and reduce the number of successful attacks, wireless devices such as a base station 105 and a UE 115 may implement symmetric key encryption such that transmissions of data may be encrypted using a secret key that is known to both the base station 105 and the UE 115. Upon receiving the transmission, the base station or the UE may securely decrypt the message using the secret key.

In some examples, reference signal transmissions such as transmissions of SRS or CSI-RS may be secured by applying the secret key to one or more parameters associated with the SRS. In some examples, the secret key may be added to a SRS sequence identifier, to various spatial relation parameters, frequency hopping parameters, or time offset parameters associated with the SRS. In some other examples, the secret key may be added to randomize a set of RRC configurations associated with the SRS, or the secret key may be used as part of an XOR operation applied to comb-level configurations or other SRS identifiers. Additionally or alternatively, the SRS sequence or SRS sequence generation parameters may be multiplied by the secret key, or the secret key may be used to introduce a phase shift or cyclic shift to antenna ports associated with the SRS transmission.

Additional reference signal transmissions such as DMRS may also implement the use of the secret key to secure transmissions. For example, the secret key may be XORed with different scrambling identifiers or cell identifiers of the DMRS. In some other examples, the secret key may be added to an initialization value for generating a binary sequence for the DMRS, or the secret key may be multiplied by the generation sequence to introduce a phase shift based on the secret key.

Figure 2:
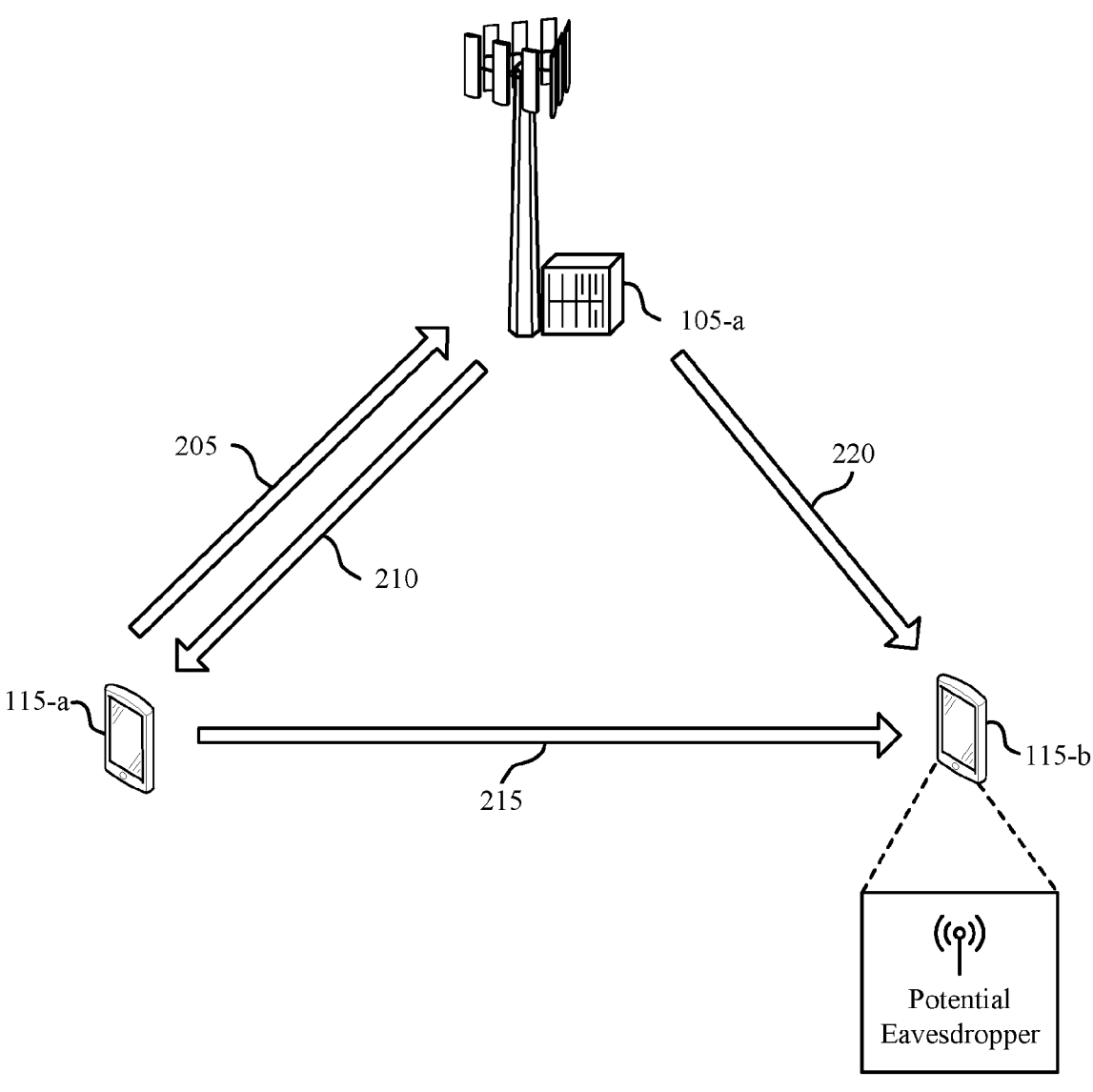

FIG. 2 illustrates an example of a wireless communications system 200 that supports reference signal security to combat eavesdropping and directional denial of service attacks in accordance with aspects of the present disclosure. In some examples, wireless communications system 200 may implement aspects of wireless communications system 100. For example, wireless communications system 200 may include communications between a first device such as a UE 115-a and a second UE 115-b, and a second device such as a base station 105-b which may be examples of base stations 105 and UE 115 described with reference to FIG. 1. In some cases, the first devices and second devices may be examples of different devices such as industrial internet of things (IoT) devices, wearable wireless communications devices, or other types of devices.

Some wireless communications systems may support the use of cryptographic keys to protect communications between wireless devices. If symmetric key encryption is used, a transmitting device may encrypt data using a secret key and the intended receiving device may decrypt the data using the same secret key, the secret key being known to both devices. For example, symmetric keys may be derived via upper layer techniques such as Diffie-Hellman methods which relies on Rivest-Shamir-Adleman (RSA) encryption, or using other techniques such as Elliptic Curve Cryptography (ECC), or other techniques, or the keys may be derived at the physical layer using channel reciprocity and randomness.

In some cases, for example, in an IoT environment or other systems with a high volume of communications devices, numerous devices may be connected to one another, which increases the likelihood of both passive (eavesdropping) and active (DOS) attacks 215 and 220. Communications involving reference signaling may also be a target for eavesdropping, which may put secure communications between the base station 105-a and UE 115-a. For example, base station 105-a may be in communication with UE 115-a via uplink channel 205 and downlink channel 210. UE 115-b may be an example of a eavesdropping device attempting to eavesdrop for data decoding or jamming base station 105-a and UE 115-a via channels 215 and 220.

To increase security for communications between the base station 105-a and the UE 115-a, secret keys may be used to secure DMRS, SRS, CSI-RS, or any combination thereof. Securing of reference signals such as DMRS may increase physical layer security of the physical downlink shared channel (PDSCH), the physical uplink shared channel (PUSCH) in addition to adding upper layer security. Additionally or alternatively, adding security to SRS may increase security against directional beamforming or smart DOS attacks (e.g., from eavesdropping UE 115-b).

For example, for an eavesdropper 115-b to decode physical layer signaling (e.g., PDSCH, physical downlink control channel (PDCCH), or PUSCH) between the base station 105-a and the UE 115-a, the eavesdropping UE 115-b may attempt to determine the DMRS associated with that signal. Therefore, in addition to upper layer security, the base station 105-a and the UE 115-a may add additional physical layer security of the DMRS using secret keys to encode and decode various DMRS parameters. For example, secret keys may be added to secure or modify DMRS scrambling identifiers or other DMRS identifier, DMRS generation functions, DMRS sequence or phase, among other parameters.

Additionally or alternatively, the base station 105-a and the UE 115-a may secure SRS to reduce potential eavesdropping attacks or attempted channel estimation by an attacker. For example, the security key may be added to an SRS sequence ID, or to one or more SRS spatial parameters, or to one or more RRC parameters associated with the SRS. In some other cases, the secret key may be used to multiply the SRS sequence or modify the phase of the SRS sequence, or to randomize cyclic shifts per antenna port associated with the SRS. In some other examples, the base station 105-a and the UE 115-a may secure CSI-RS or other reference signals at the physical layer to protect against eavesdropping attempts.

Figure 3:
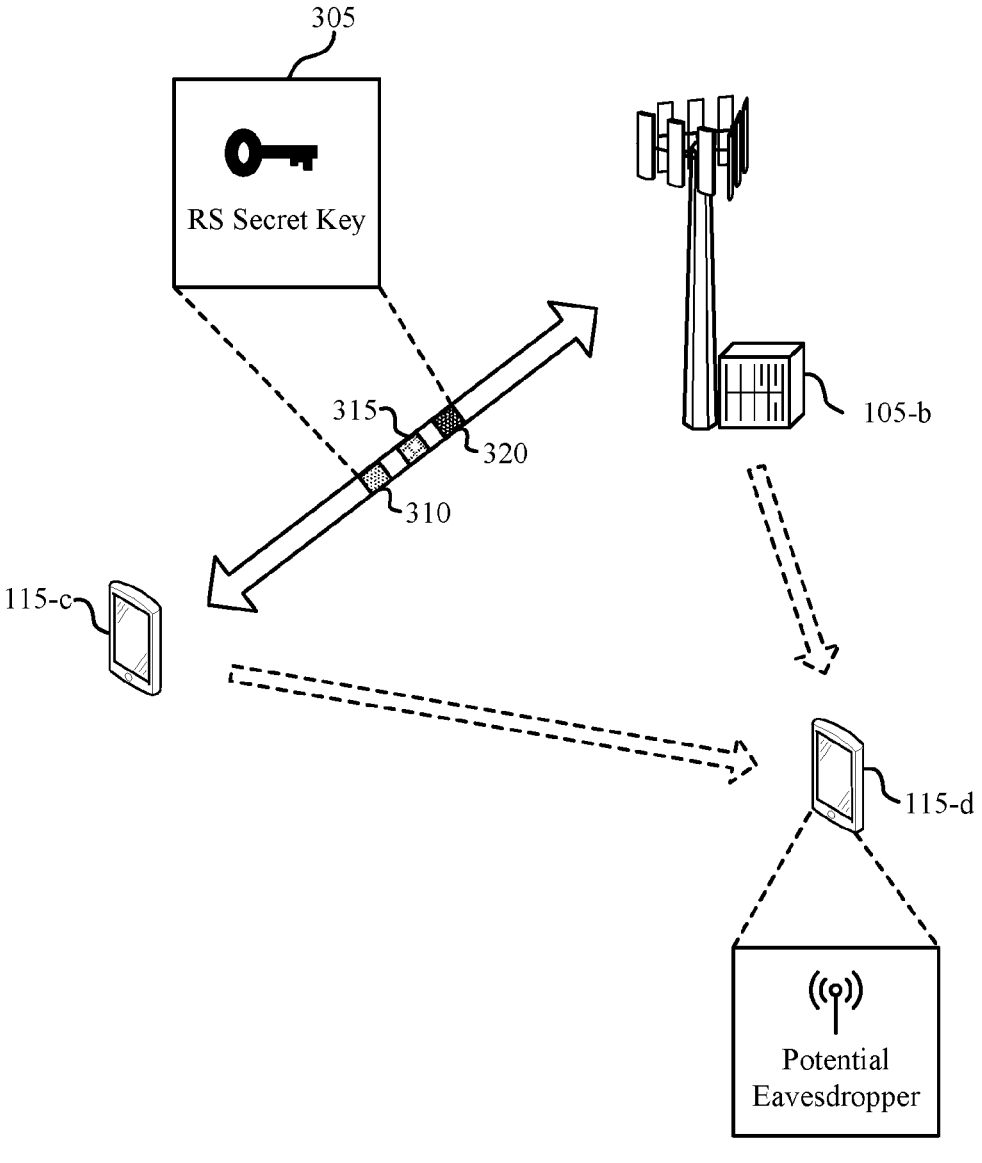

FIG. 3 illustrates an example of a wireless communications system 300 that supports reference signal security to combat eavesdropping and directional denial of service attacks in accordance with aspects of the present disclosure. For example, FIG. 3 may include communications between a base station 105-b, UE 115-c, and 115-d, which maybe examples of base station 105 and UE 115 described with reference to FIGS. 1 and 2.

Wireless communications system 300 may support the use of cryptographic keys to further secure communications between devices such as reference signaling between the UE 115-c and the base station 105-b. For example, the UE 115-c and the base station 105-b may implement the use of symmetric key encryption in which both the UE 115-c and the base station 105-b are aware of the secret key. In such examples, the transmitting device may encrypt the data using the secret key 305, and the receiving device may decrypt the data using the same secret key 305. The use of data encryption using the secret key may reduce the likelihood for eavesdropping and other denial of service attacks by other devices in the system, such as by UE 115-d.

The base station 105-b and the UE 115-c may implement secure communications using the secret key 305 to a number of different reference signals. In a first set of examples, the base station 105-b and the UE 115-c may use the secret key 305 to secure one or more parameters associated with SRS communications 310. For example, in a first option, the UE 115-c may secure an SRS sequence ID (e.g., the higher layer parameter sequenceId) using the secret key. In such examples, the UE 115-c may add the key to the ID in the decimal domain (with a module equal to the maximum value), or the UE 115-c may convert the ID to a binary domain (e.g., using a pseudorandom binary sequence) and perform an XOR operation to add the key to the binary domain.

In a second option, the UE 115-c may secure one or more spatial relation parameters associated with the SRS communications 310. For example, the UE 115-c may secure the parameter spatialRelationInfo with the secret key, which may reduce the likelihood that the eavesdropping UE 115-d performs accurate channel estimation. In some examples, the parameter spatialRelationInfo may include an ID of a reference-reference signal, and the spatial relationship may be determined between the reference-reference signal and the target SRS 310. The reference-reference signal may be a synchronization signal (SS) block, a physical broadcast channel (PBCH) block, a CSI-RS or an SRS configured on the same or different component carrier or bandwidth part as the target SRS 310.

In a third option, the UE 115-c may randomize one or more RRC parameters or RRC configurations (e.g., partially or fully) with the secret key to secure the RRC parameters. For example, the UE 115-c may randomize the parameters srs-BandwithConfig ((SRS), cyclicShift, srs-configIndex, transmissionComb, or any combination thereof using the secret key. In some other examples, the UE 115-c may configure a "dummy" SRS parameter (C_SRS) such that a receiving device which receives the dummy SRS parameter would use the key in order to decode the real configuration of the C_SRS (e.g., the key impact on that dummy C_SRS results in the configuration of C_SRS).

In a fourth option, the UE 115-c may apply the secret key to a comb-level configuration (e.g., a comb-shaped transmission with equally-spaced outputs allocated over the transmission bandwidth) such that the comb is XORed with the secret key. For example, using the secret key 305, the base station 105-b may configure the UE 115-c with a first transmission comb (e.g., comb x) which when XORed with the secret key may result in a second transmission comb (e.g., comb y), where the second transmission comb is the comb that the UE 115-c is configured to use. In some other cases, the base station 105-b indicate the number of symbols having SRS resources for transmission of the SRS using the secret key.

In a fifth option, the UE 115-c may multiply the SRS sequence with a phase shift (e.g., rotate the sequence using the phase shift), where the phase shift is based on the secret key 305. In some other cases, the UE 115-c may swap the real and imaginary portions of the SRS sequence based on the secret key 305. In a sixth option, the UE 115-c may randomize the amplitude scaling factor with the secret key 305. For example, the UE 115-c may use the secret key 305 to at least partially randomize the amplitude scaling factor parameter for the SRS 310.

In a seventh option, the UE 115-c may randomize the channel phase by introducing phase shift to the SRS sequence based on the secret key 305. For example, the phase shift may be a ramp in the frequency domain, a set of random phases that are generated from the secret key 305, or the secret key 305 may be used as a seed function to generate a set of phases with size equal to the SRS sequence size.

In an eighth option, the UE 115-*c* may randomize the cyclic shift of the SRS sequence per antenna port based on the secret key. For example, the UE 115-*c* may a randomize or shuffle the use of antenna ports based on the secret key 305, and a cyclic shift could be used based on the secret key 305. In some other examples, the phase shift or random phase may be applied per symbol or per antenna port such that different phases are generated across antenna ports, or the same phases are used across antenna ports for the same OFDM symbol. In such cases, the random phases may vary per antenna port based on the secret key 305. Based on using the secret key 305 to apply a cyclic shift or random phase to each antenna port, the eavesdropping UE 115-*d* may be unable to reverse the effect of the secret key 305 an know the cyclic shift corresponding to each port.

In a ninth option, the UE 115-*c* may use an XOR operation to combine an SRS ID parameter (e.g., n_ID_SRS) with the secret key 305. Additionally or alternatively, the UE 115-*c* may generate a "dummy" ID by applying the secret key 305, such that after adding or XORing the dummy ID with the secret key 305, the UE 115-*c* may be able to determine the real SRS ID parameter (e.g., n_ID_SRS). In some other cases, the UE 115-*c* may apply similar techniques to one or more frequency hopping IDs, frequency hopping parameters, time offset parameters, or any combination thereof.

In a tenth option, the UE 115-*c* may randomize a first set of base sequence group numbers (e.g., values of u included in a table, the values of u being 0 through 29) using the secret key 305. In some examples, the base station 105-*b* may configure a second set of base sequence group numbers (e.g., u' values) for the UE 115-*c* such that XORing the second set of base sequence group numbers (e.g., u') with the secret key 305 results in the first group of base sequence group numbers (e.g., u) known by the UE 115-*c* and the base station 105-*b*. In some examples, the addition of the XOR operation with the secret key 305 may add an additional layer of security to the SRS sequence because the eavesdropping UE 115-*d* would need to try a large number of base sequence group numbers (e.g., all 30 u values in the table) to figure out the right u value for the UE 115-*c*.

In addition, in some examples the UE 115-*c* and the base station 105-*b* may employ a combination of options one through ten described herein to secure the SRS 310 using the secret key 305.

In some other cases, the base station 105-*b* and the UE 115-*c* may use the secret key 305 to secure one or more parameters associated with DMRS communications 315. For example, in a first option, the UE 115-*c* may XOR the secret key 305 with one or more DMRS scrambling identifiers. For example, after receiving the secret key 305, the base station 105-*b* may generate a "dummy" ID such that the dummy ID XORed with the secret key 305 would result in the scrambling ID that the base station 105-*b* assigns to the UE 115-*c*. Based on the XOR operation of the dummy ID, the UE 115-*c* may securely determine the correct scrambling ID for the DMRS 315.

In a second option, the UE 115-*c* may XOR one or more DMRS identifier parameter (e.g., nSCID, N_ID) with the secret key or with a secret key bit. Additionally or alternatively, the base station 105-*b* may generate a dummy DMRS identifier (e.g., a dummy N_ID) such that the N_ID) that the base station 105-*b* allocates for the UE 115-*c* may be determined by XORing the dummy ID with the secret key

305. In some other examples, the base station 105-*b* may allocate a dummy PDCCH scrambling identifier (e.g., PDCCH_scambling_ID)) to the UE 115-*c*, and the UE 115-*c* may determine the real PDCCH scrambling identifier to use by XORing the dummy PDCCH scrambling identifier with the secret key 305.

In some examples, an XOR operation may be used for encoding or decoding, or for encryption or decryption. Additionally or alternatively, the UE 115-*c* may implement advanced encryption standard (AES) encryption or other symmetric types of encryption (e.g., cryptographic tech that employs XOR, block ciphering, bit-wise XOR) or combination thereof, which uses the same key encrypt and decrypt data and other parameters. In some cases, the encryption procedure may implement a substitution permutation network (SPN) algorithm, which uses multiple rounds to encrypt data using symmetric keys.

In a third option, the UE 115-*c* may add the secret key value to an initialization value for generating a pseudorandom binary sequence (e.g., $C_{init}$). For example, the UE 115-*c* may add a binary random variable or random noise to the sequence c (n) based on the secret key 305.

In a fourth option, the UE 115-*c* may swap the real and imaginary values of the DMRS generation function (e.g., r (m)) based on the secret key 305. In a fifth option, the UE 115-*c* may multiply the generation function with a phase shift based on the secret key 305, and each tone or channel may be multiplied with a random phase based on the secret key 305. In such cases, the UE 115-*c* may reverse the multiplication of the generation function using that using the secret key 305. In some other cases, the UE 115-*c* may add complex random values or random noise to the generation function based on the secret key 305. In such cases, the random noise may be another sequence with different initiation value (e.g., $C_{init}$) or completely random sequence (e.g., drawn from a Gaussian random variable). Combination of the above In addition, in some examples the UE 115-*c* and the base station 105-*b* may employ a combination of options one through five described herein to secure the DMRS 315 using the secret key 305.

In some other cases, the base station 105-*b* and the UE 115-*c* may use the secret key 305 to secure one or more parameters associated with CSI-RS communications 320. For example, in a first option, the UE 115-*c* may secure an CSI-RS sequence ID using the secret key. In a second option, the UE 115-*c* may secure one or more spatial relation parameters associated with the CSI-RS communications 320. For example, the UE 115-*c* may secure a spatial relation information parameter with the secret key, which may reduce the likelihood that the eavesdropping UE 115-*d* performs accurate channel estimation. In some examples, the spatial relation parameter may include an ID of a reference-reference signal, and the spatial relationship may be determined between the reference-reference signal and the target CSI-RS 320. The reference-reference signal may be a synchronization signal (SS) block, a physical broadcast channel (PBCH) block, a CSI-RS or an SRS configured on the same or different component carrier or bandwidth part as the target CSI-RS 320.

In a third option, the UE 115-*c* may multiply the CSI-RS sequence with a phase shift (e.g., rotate the sequence using the phase shift), where the phase shift is based on the secret key 305. In some other cases, the UE 115-*c* may swap the real and imaginary portions of the CSI-RS sequence based on the secret key 305. In a sixth option, the UE 115-*c* may randomize or otherwise secure the amplitude scaling factor with the secret key 305. For example, the UE 115-*c* may use the secret key 305 to at least partially randomize the amplitude scaling factor parameter for the CSI-RS 320.

In a fourth option, the UE 115-*c* may randomize the channel phase by introducing phase shift to the CSI-RS sequence based on the secret key 305. For example, the phase shift may be a ramp in the frequency domain, a set of random phases that are generated from the secret key 305, or the secret key 305 may be used as a seed function to generate a set of phases with size equal to the CSI-RS sequence size.

In a fifth option, the UE 115-*c* may randomize the cyclic shift of the CSI-RS sequence per antenna port based on the secret key. For example, the UE 115-*c* may randomize or shuffle the use of antenna ports based on the secret key 305, and a cyclic shift could be used based on the secret key 305. In some other examples, the phase shift or random phase may be applied per symbol or per antenna port such that different phases are generated across antenna ports, or the same phases are used across antenna ports for the same OFDM symbol. In such cases, the random phases may vary per antenna port based on the secret key 305. Based on using the secret key 305 to apply a cyclic shift or random phase to each antenna port, the eavesdropping UE 115-*d* may be unable to reverse the effect of the secret key 305 an know the cyclic shift corresponding to each port.

In addition, in some examples the UE 115-*c* and the base station 105-*b* may employ a combination of options one through five described herein to secure the CSI-RS 320 using the secret key 305.

Figure 4:
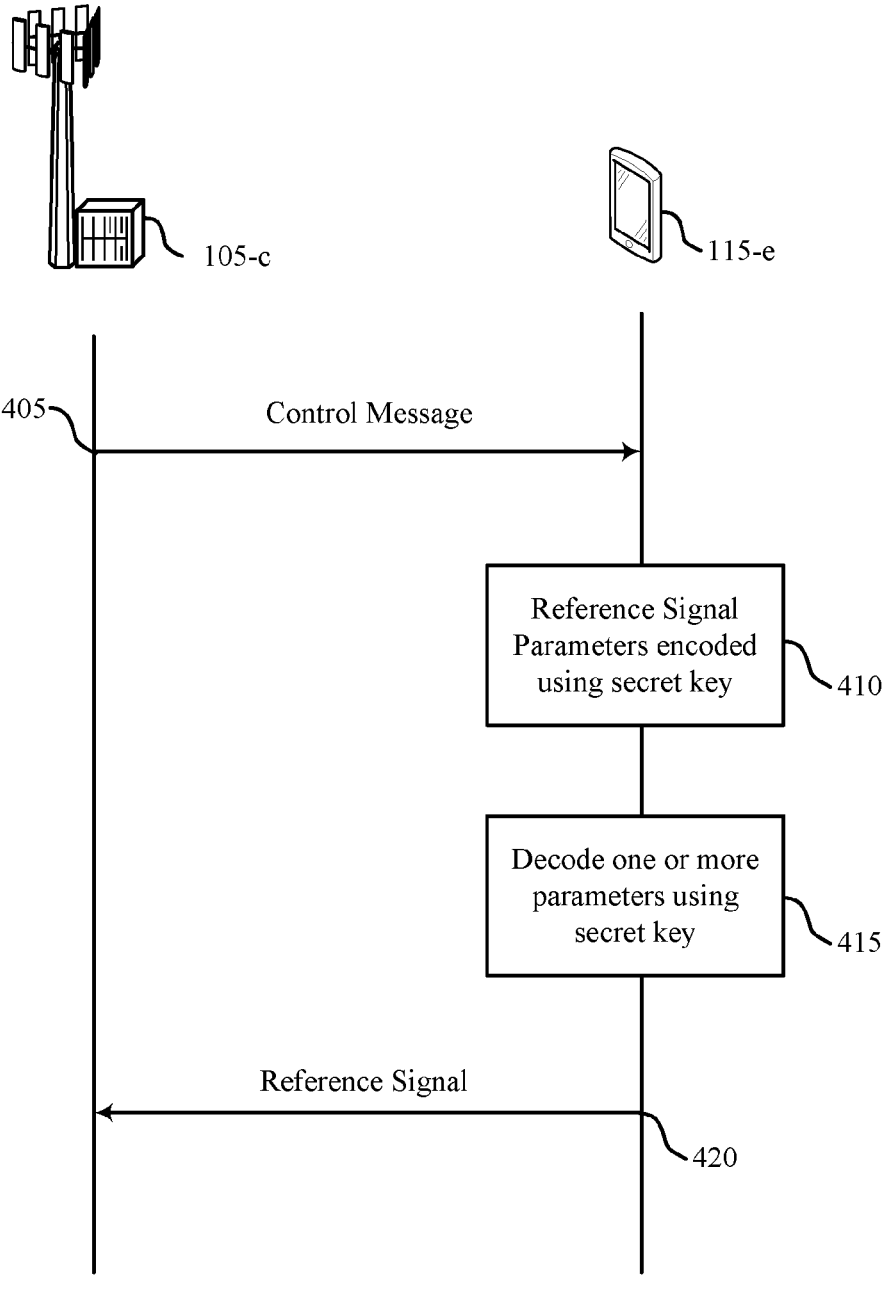
FIG. 4 illustrates an example of a process flow that supports reference signal security to combat eavesdropping and directional denial of service attacks in accordance with aspects of the present disclosure.

FIG. 4 illustrates an example of a process flow 400 that supports reference signal security to combat eavesdropping and directional denial of service attacks in accordance with aspects of the present disclosure. The process flow 400 may implement aspects of wireless communications systems 100-300, or may be implemented by aspects of the wireless communications system 100-300. For example, the process flow 400 may illustrate operations between a UE 115-*e* and a base station 105-*c*, which may be examples of corresponding devices described with reference to FIGS. 1-3. In the following description of the process flow 400, the operations between the UE 115-*e* and the base station 105-*c* may be transmitted in a different order than the example order shown, or the operations performed by the UE 115-*e* and the base station 105-*c* may be performed in different orders or at different times. Some operations may also be omitted from the process flow 400, and other operations may be added to the process flow 400. In addition, the operations between the UE 115-*e* and the base station 105-*c* may occur between different wireless devices described herein.

At 405, the base station 105-*c* may transmit, and the UE 115-*e* may receive an indication of a number of parameters associated with a reference signal to be transmitted by the UE 115-*e*. In some examples, the parameters may be encoded separately from the rest of the control message using a secret key that is known by the UE 115-*e* and the base station 105-*c*.

At 410, the UE 115-*e* may identify the reference signal parameters that are encoded using the secret key, and at 415, the UE 115-*e* may decode the reference signal parameters using the secret key.

In some implementations, the reference signal parameters may be associated with an SRS. In one example, the UE 115-*e* may decode the one or more parameters of the SRS using the secret key, where the one or more parameters is an SRS sequence ID secured using the secret key. For example, the secret key may be added to the SRS sequence ID in a decimal domain, or may be added to a binary format of the SRS sequence ID.

In some other cases, the SRS parameters may be spatial relation parameters secured using the secret key. For example, the spatial relation parameters may be associated with a spatial relation between the SRS and an SSB, a physical broadcast shared channel (PBSCH) block, a channel state information reference signal, or another SRS. In some other cases, the SRS parameters may include an indication of RRC configurations that are at least partially secured using the secret key. For example, each of the set of RRC configurations may include a bandwidth configuration parameter, a cyclic shift parameter, a SRS indexing configuration, a transmission comb configuration, or a combination thereof. In some other examples, the set of RRC configurations may include at least a false bandwidth configuration parameter such that application of the secret key to the false bandwidth configuration parameter yields a true bandwidth configuration parameter.

In some other examples, the SRS parameters may be a set of comb level transmission configurations that are combined with the secret key using an XOR operation. For example, the set of comb level transmission configurations may include at least a first comb configuration and a second comb configuration, and the first comb level configuration is secured using the secret key. Then the UE 115-*e* may obtain the second comb level configuration by applying the XOR operation to the first comb level configuration.

In some other examples, the SRS parameters include a real portion and an imaginary portion of a phase shifted sequence, and the UE 115-*e* may swap the real portion and the imaginary portion of the phase shifted sequence in accordance with the secret key. In some examples, the SRS parameters may include an amplitude scaling factor for the SRS sequence that is secured using the secret key.

Additionally or alternatively, the SRS parameters may include a phase shift of a channel phase generated based at least in part on the secret key. For example, the phase shift may be a ramp in frequency, a set of random phases generated using the secret key, or both. In some cases, the SRS parameters may include a cyclic shift for a number of antenna ports for transmission of the SRS based on the secret key. For example, in some cases the cyclic shift may be applied on a per-antenna port basis based on the secret key.

In some other examples, the SRS parameters may be a set of time offset parameters, a frequency hopping ID parameter, or a set of sequence ID parameters secured using the secret key. For example, the set of sequence ID parameters may include at least a first sequence identity parameters and a second sequence identity parameters, and the first sequence identity parameter is secured using the secret key. In such cases, applying an XOR operation to the first sequence identity parameter results in the second sequence identity parameter.

In some other examples, the SRS parameters may include a set of base sequence group numbers combined with the secret key using an XOR operation. For example, the set of base sequence group numbers may include at least a first base sequence group number and a second base sequence group number, and the first base sequence group number is secured using the secret key. In such examples, applying the XOR operation to the first base sequence group number results in the second base sequence group number.

In some other implementations, the reference signal parameters may be associated with a DMRS. For example, a set of DMRS parameters may be a set of scrambling identifiers, a set of cell identifiers, or both, combined with the secret key using an XOR operation, and the UE 115-*e* may decode the DMRS parameters using the secret key. In some cases, the DMRS parameters may include an initialization value ($C_{init}$) for generating a pseudorandom binary sequence secured using the secret key. In some other cases, the DMRS parameters may include a binary random variable or random noise added to a pseudorandom binary sequence for DMRS secured using the secret key.

In some other examples, the DMRS parameters may include a generation function for a phase shifted sequence secured using the secret key. For example, the generation function may be secured using the secret key by swapping a real portion of the generation function and an imaginary portion of the generation function in accordance with the secret key, multiplying the generation function based at least in part on the secret key, adding complex random values or random noise based at least in part on the secret key, or any combination thereof.

In some other implementations, the reference signal parameters may be associated with a CSI-RS. The UE 115-*e* may receive one or more parameters of a CSI-RS (e.g., spatial parameters) that are secured using the secret key, and the UE 115-*e* may decode the CSI-RS in accordance with the secret key, and may perform one or more CSI measurements based on decoding the CSI-RS using the secret key.

At 420, the UE 115-*e* may transmit, and the base station 105-*c* may receive, a reference signal (e.g., SRS, DMRS, CSI-RS) based on decoding of the one or more reference signal parameters.

Figure 5:
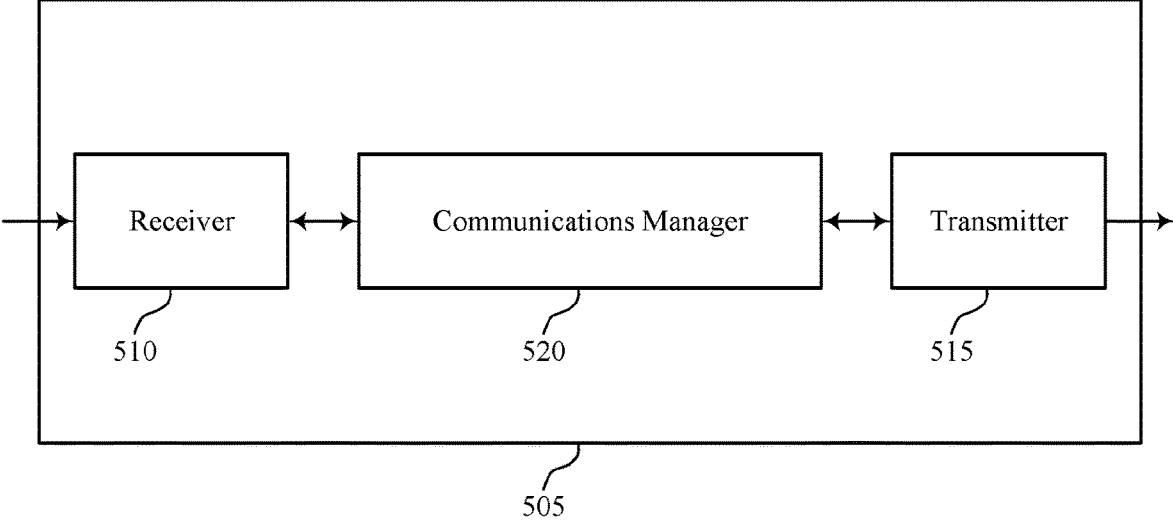
FIGS. 5 and 6 show block diagrams of devices that support reference signal security to combat eavesdropping and directional denial of service attacks in accordance with aspects of the present disclosure.

FIG. 5 shows a block diagram 500 of a device 505 that supports reference signal security to combat eavesdropping and directional denial of service attacks in accordance with aspects of the present disclosure. The device 505 may be an example of aspects of a UE 115 as described herein or another wireless device described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reference signal security to combat eavesdropping and directional denial of service attacks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reference signal security to combat eavesdropping and directional denial of service attacks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reference signal security to combat eavesdropping and directional denial of service attacks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, an indication of one or more parameters associated with a reference signal to be transmitted by the UE, the one or more parameters encoded separately from other communication parameters received from the base station using a secret key that is known by the UE and the base station. The communications manager 520 may be configured as or otherwise support a means for decoding the one or more parameters associated with the reference signal using the secret key. The communications manager 520 may be configured as or otherwise support a means for transmitting, to the base station, the reference signal in accordance with the one or more parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased reliability and security for communications, improved reference signal coordination, and increased throughput.

Figure 6:
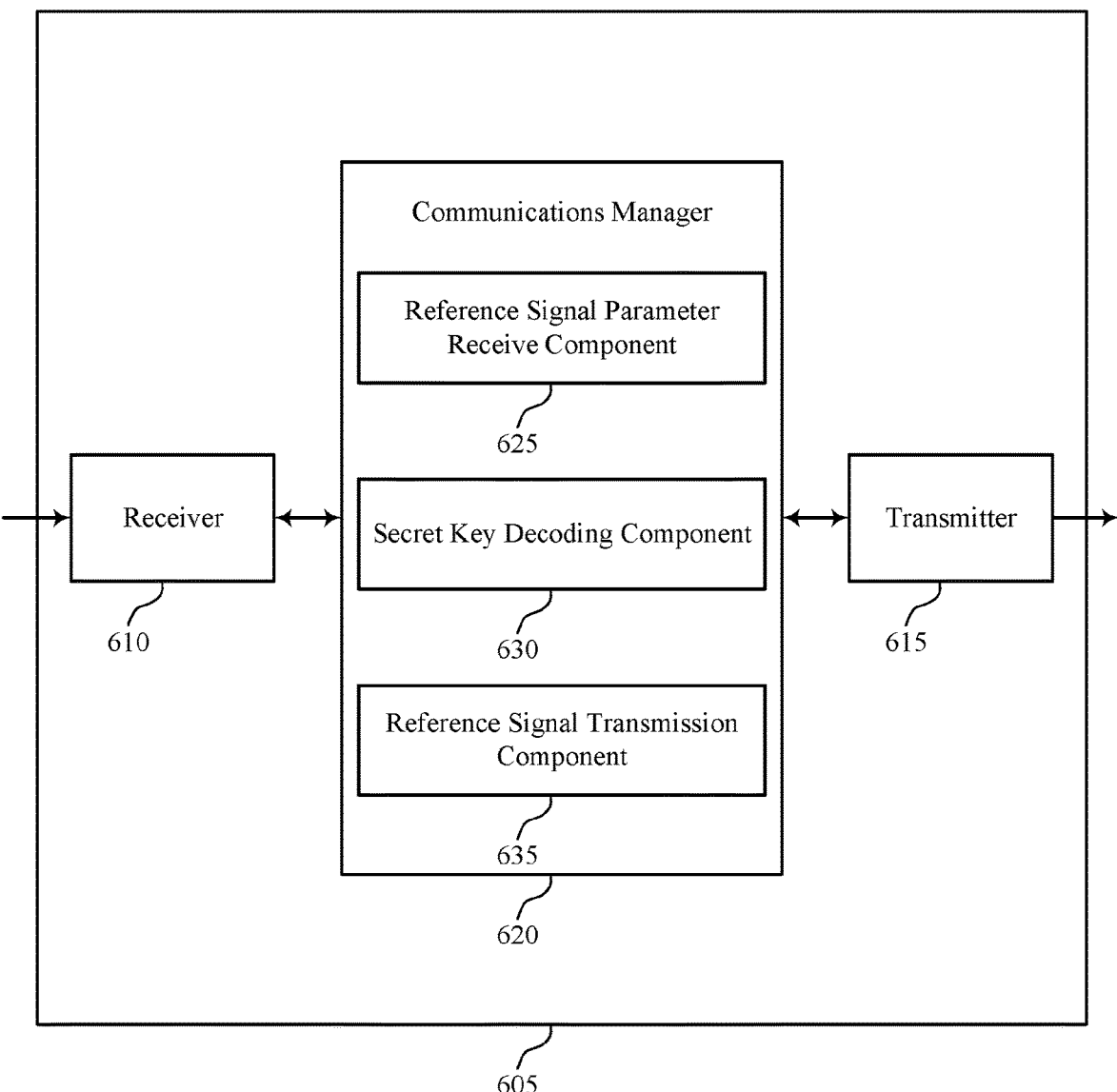

FIG. 6 shows a block diagram 600 of a device 605 that supports reference signal security to combat eavesdropping and directional denial of service attacks in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reference signal security to combat eavesdropping and directional denial of service attacks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reference signal security to combat eavesdropping and directional denial of service attacks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reference signal security to combat eavesdropping and directional denial of service attacks as described herein. For example, the communications manager 620 may include a reference signal parameter receive component 625, a secret key decoding component 630, a reference signal transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE or a first wireless device in accordance with examples as disclosed herein. The reference signal parameter receive component 625 may be configured as or otherwise support a means for receiving, from a base station, an indication of one or more parameters associated with a reference signal to be transmitted by the UE, the one or more parameters encoded separately from other communication parameters received from the base station using a secret key that is known by the UE and the base station. The secret key decoding component 630 may be configured as or otherwise support a means for decoding the one or more parameters associated with the reference signal using the secret key. The reference signal transmission component 635 may be configured as or otherwise support a means for transmitting, to the base station, the reference signal in accordance with the one or more parameters.

Figure 7:
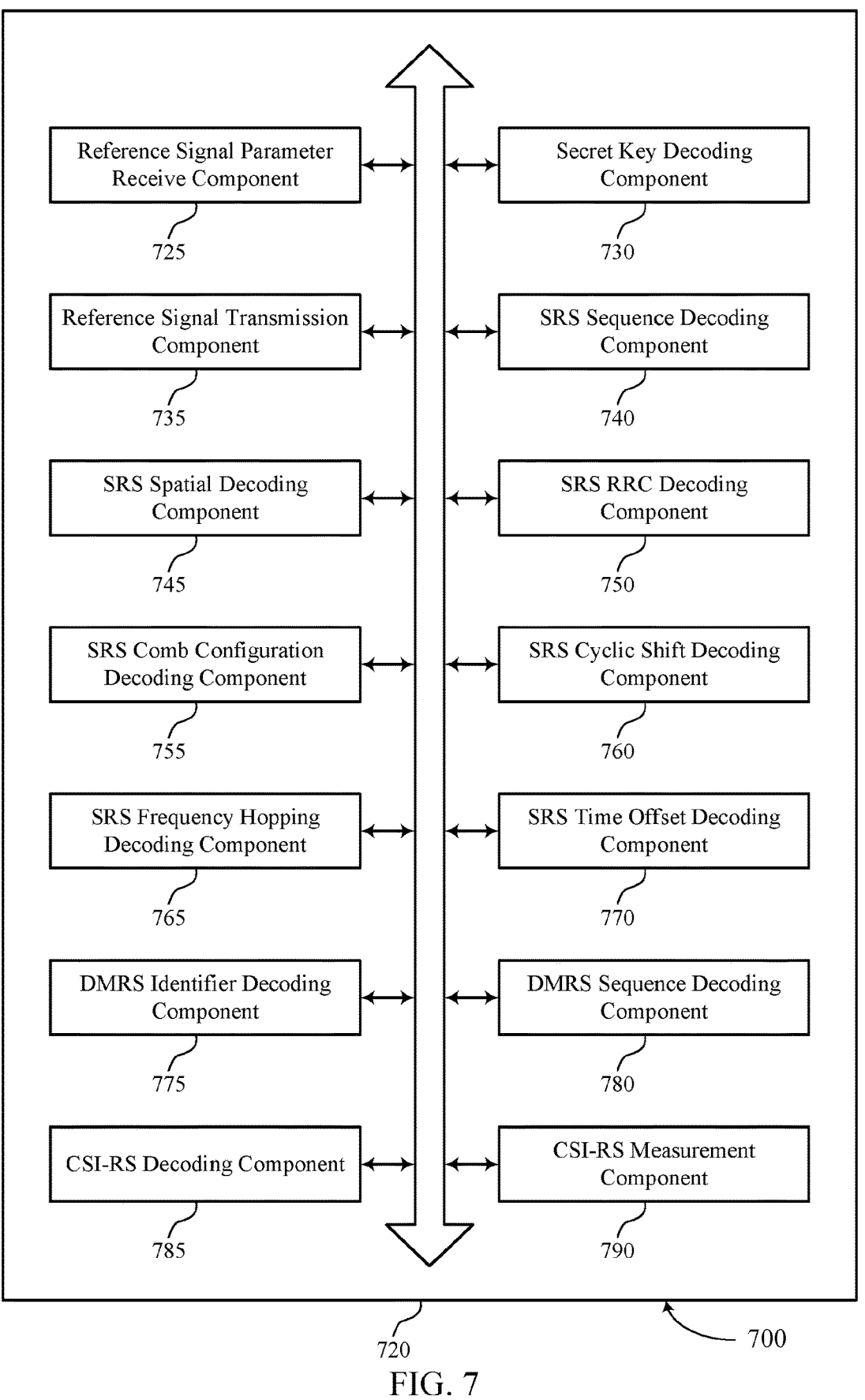
FIG. 7 shows a block diagram of a communications manager that supports reference signal security to combat eavesdropping and directional denial of service attacks in accordance with aspects of the present disclosure.

FIG. 7 shows a block diagram 700 of a communications manager 720 that supports reference signal security to combat eavesdropping and directional denial of service attacks in accordance with aspects of the present disclosure. The communications manager 720 may be an example of aspects of a communications manager 520, a communications manager 620, or both, as described herein. The communications manager 720, or various components thereof, may be an example of means for performing various aspects of reference signal security to combat eavesdropping and directional denial of service attacks as described herein. For example, the communications manager 720 may include a reference signal parameter receive component 725, a secret key decoding component 730, a reference signal transmission component 735, an SRS sequence decoding component 740, an SRS spatial decoding component 745, an SRS RRC decoding component 750, an SRS comb configuration decoding component 755, an SRS cyclic shift decoding component 760, an SRS frequency hopping decoding component 765, an SRS time offset decoding component 770, a DMRS identifier decoding component 775, a DMRS sequence decoding component 780, a CSI-RS decoding component 785, a CSI-RS measurement component 790, or any combination thereof. Each of these components may communicate, directly or indirectly, with one another (e.g., via one or more buses).

The communications manager 720 may support wireless communications at a UE or a first wireless device in accordance with examples as disclosed herein. The reference signal parameter receive component 725 may be configured as or otherwise support a means for receiving, from a base station, an indication of one or more parameters associated with a reference signal to be transmitted by the UE, the one or more parameters encoded separately from other communication parameters received from the base station using a secret key that is known by the UE and the base station. The secret key decoding component 730 may be configured as or otherwise support a means for decoding the one or more parameters associated with the reference signal using the secret key. The reference signal transmission component 735 may be configured as or otherwise support a means for transmitting, to the base station, the reference signal in accordance with the one or more parameters.

In some examples, the reference signal includes a SRS, and the one or more parameters include a SRS sequence identifier secured using the secret key.

In some examples, the secret key is added to the SRS sequence identifier in a decimal domain or is added to a binary format of the SRS sequence identifier in a binary domain.

In some examples, the reference signal includes a SRS, and the one or more parameters include one or more spatial relation parameters secured using the secret key, the one or more spatial relation parameters being associated with a spatial relation between the SRS and one of a synchronization signal block, a broadcast channel block, a channel state information reference signal, or another SRS.

In some examples, the reference signal includes a SRS, and the one or more parameters include an indication of one or more RRC configurations that are at least partially secured using the secret key.

In some examples, each of the one or more RRC configurations include a bandwidth configuration parameter, a cyclic shift parameter, a SRS indexing configuration, a transmission comb configuration, or a combination thereof.

In some examples, the one or more RRC configurations include a false bandwidth configuration parameter, and application of the secret key to the false bandwidth configuration parameter yields a true bandwidth configuration parameter.

In some examples, the reference signal includes a SRS, and the one or more parameters include one or more comb level configurations combined with the secret key using an XOR operation.

In some examples, the one or more comb level configurations include at least a first comb configuration and a second comb configuration, and the first comb level configuration is secured using the secret key and applying the XOR operation to the first comb level configuration results in the second comb level configuration.

In some examples, the reference signal includes a SRS, and the one or more parameters include a real portion and an imaginary portion of a phase shifted sequence. In some examples, the reference signal includes a SRS, and the SRS sequence decoding component 740 may be configured as or otherwise support a means for swapping the real portion and the imaginary portion in accordance with the secret key.

In some examples, the reference signal includes a SRS, and the one or more parameters include an amplitude scaling factor secured based on the secret key.

In some examples, the reference signal includes a SRS, and the one or more parameters include a phase shift of a channel phase generated based on the secret key, the phase shift being a ramp in frequency, a set of random phases generated using the secret key, or both.

In some examples, the reference signal includes a SRS, and the one or more parameters include a cyclic shift for a set of multiple antenna ports based on the secret key.

In some examples, the cyclic shift is applied per antenna port of the set of multiple antenna ports based on the secret key.

In some examples, the reference signal includes a SRS, and the one or more parameters include a set of sequence identity parameters secured using the secret key.

In some examples, the set of sequence identity parameters include at least a first sequence identity parameters and a second sequence identity parameters, and the first sequence identity parameter is secured using the secret key and applying an XOR operation to the first sequence identity parameter results in the second sequence identity parameter.

In some examples, the reference signal includes a SRS, and the one or more parameters include a frequency hopping identification parameter secured using the secret key.

In some examples, the reference signal includes a SRS, and the one or more parameters include one or more time offset parameters secured using the secret key.

In some examples, the reference signal includes a SRS, and the one or more parameters include a set of one or more base sequence group numbers combined with the secret key using an XOR operation.

In some examples, the set of one or more base sequence group numbers include at least a first base sequence group number and a second base sequence group number, and the first base sequence group number is secured using the secret key and applying the XOR operation to the first base sequence group number results in the second base sequence group number.

In some examples, the reference signal includes a DMRS, and the one or more parameters include a set of scrambling identifiers, a set of cell identifiers, or both, combined with the secret key using an XOR operation.

In some examples, the reference signal includes a DMRS, and the one or more parameters include an initialization value for generating a pseudorandom binary sequence secured using the secret key.

In some examples, the reference signal includes a DMRS, and the one or more parameters include a binary random variable or random noise added to a pseudorandom binary sequence secured using the secret key.

In some examples, the reference signal includes a DMRS, and the DMRS sequence decoding component 780 may be configured as or otherwise support the one or more parameters including a generation function for a phase shifted sequence secured using the secret key.

In some examples, securing the generation function includes swapping a real portion of the generation function and an imaginary portion of the generation function in accordance with the secret key, multiplying the generation function based on the secret key, adding complex random values or random noise based on the secret key, or any combination thereof.

In some examples, the CSI-RS decoding component 785 may be configured as or otherwise support a means for receiving, from the base station, a CSI-RS that is secured using the secret key. In some examples, the CSI-RS decoding component 785 may be configured as or otherwise support a means for decoding the CSI-RS in accordance with the secret key. In some examples, the CSI-RS measurement component 790 may be configured as or otherwise support a means for performing one or more channel state information measurements based on the decoding of the secured CSI-RS.

Figure 8:
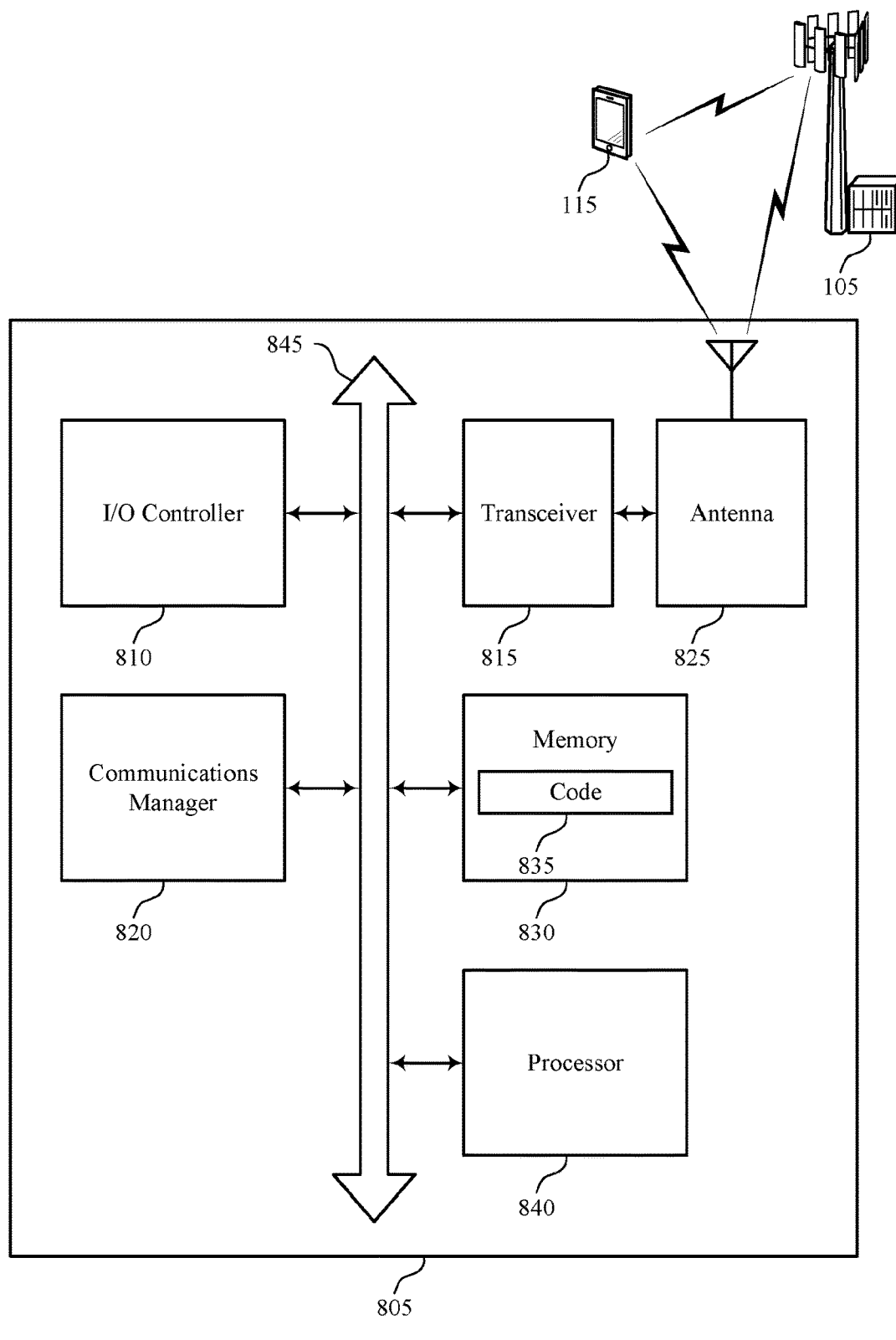
FIG. 8 shows a diagram of a system including a device that supports reference signal security to combat eavesdropping and directional denial of service attacks in accordance with aspects of the present disclosure.

FIG. 8 shows a diagram of a system 800 including a device 805 that supports reference signal security to combat eavesdropping and directional denial of service attacks in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bidirectional voice and data communications including components for transmitting and receiving communications, such as a communications manager 820, an input/output (I/O) controller 810, a transceiver 815, an antenna 825, a memory 830, code 835, and a processor 840. These components may be coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal security to combat eavesdropping and directional denial of service attacks). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, an indication of one or more parameters associated with a reference signal to be transmitted by the UE, the one or more parameters encoded separately from other communication parameters received from the base station using a secret key that is known by the UE and the base station. The communications manager 820 may be configured as or otherwise support a means for decoding the one or more parameters associated with the reference signal using the secret key. The communications manager 820 may be configured as or otherwise support a means for transmitting, to the base station, the reference signal in accordance with the one or more parameters.

By including or configuring the communications manager 820 in accordance with examples as described herein, the device 805 may support techniques for support techniques for improved communication reliability, reduced latency, improved coordination between devices, and enhanced security of reference signaling. For example, the described techniques may allow for reduced success for DOS attacks thus increased reliability and security for communications in high-traffic networks.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reference signal security to combat eavesdropping and directional denial of service attacks as described herein, or the processor 840 and the memory 830 may be otherwise configured to perform or support such operations.

Figure 9:
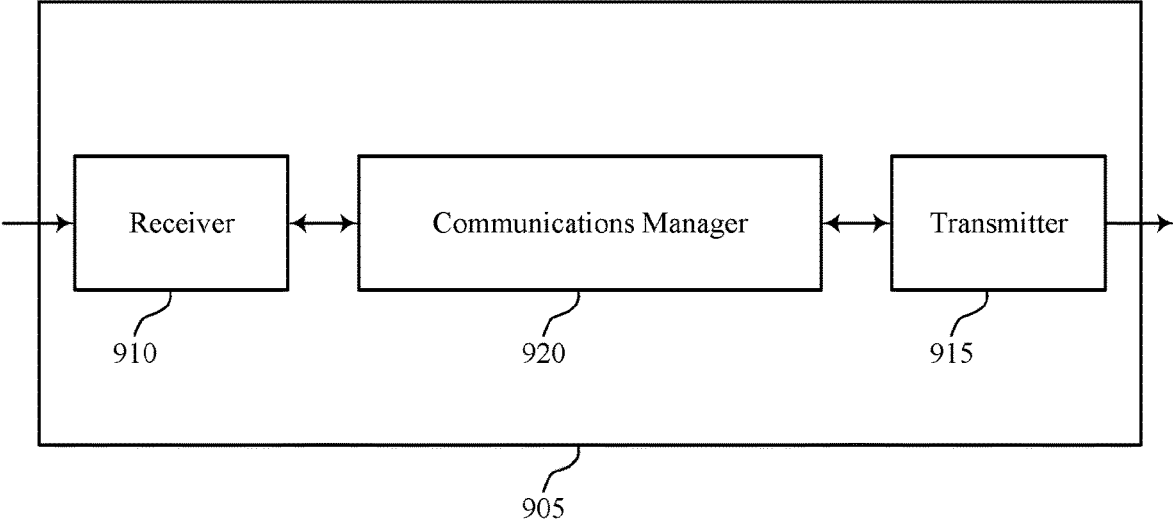
FIGS. 9 and 10 show block diagrams of devices that support reference signal security to combat eavesdropping and directional denial of service attacks in accordance with aspects of the present disclosure.

FIG. 9 shows a block diagram 900 of a device 905 that supports reference signal security to combat eavesdropping and directional denial of service attacks in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal security to combat eavesdropping and directional denial of service attacks). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal security to combat eavesdropping and directional denial of service attacks). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of reference signal security to combat eavesdropping and directional denial of service attacks as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, an indication of the one or more parameters associated with a reference signal to be transmitted by the UE, the one or more parameters encoded separately from other communication parameters received from the base station using a secret key that is known by the UE and the base station. The communications manager 920 may be configured as or otherwise support a means for receiving, from the UE, the reference signal in accordance with the one or more parameters.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increased reliability and security for communications, improved reference signal coordination, and increased throughput.

Figure 10:
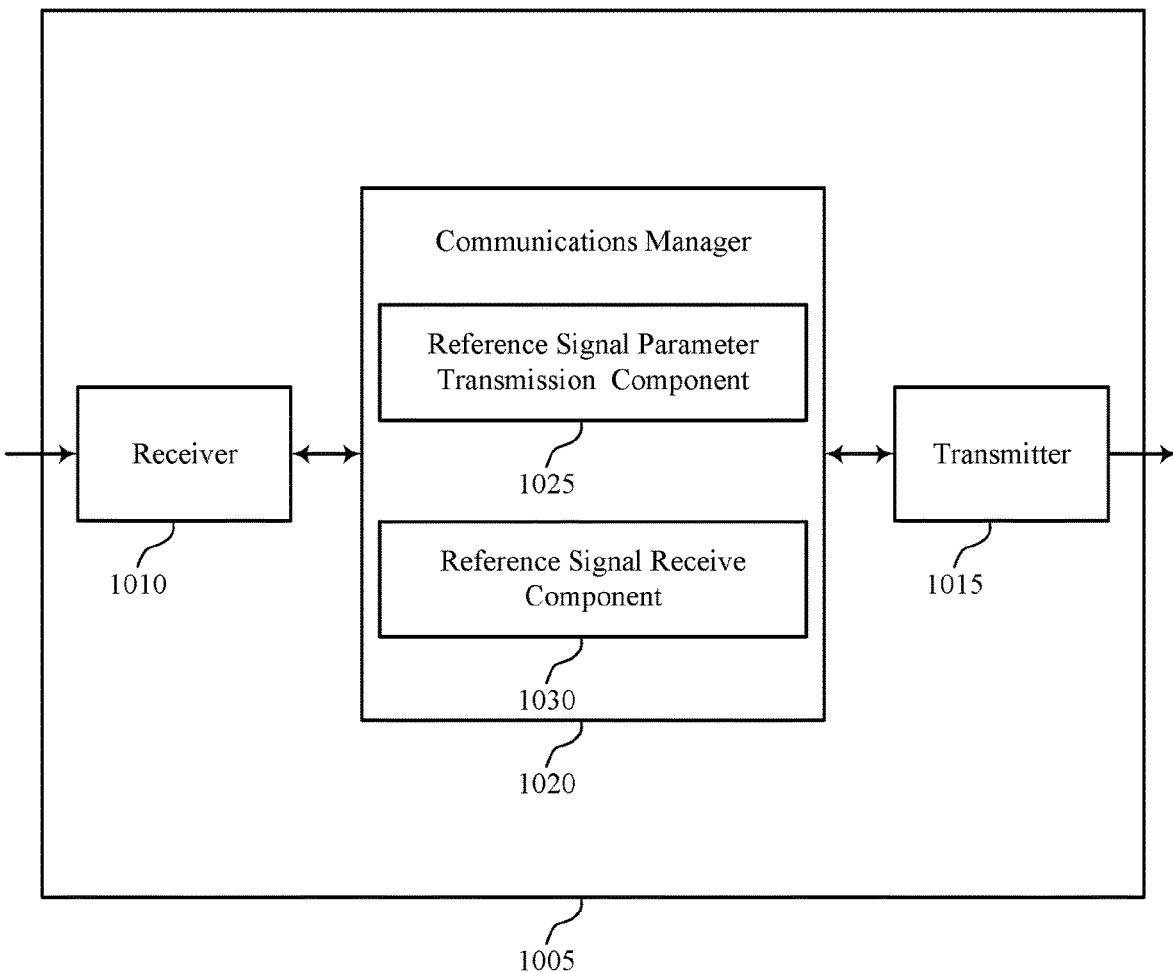

FIG. 10 shows a block diagram 1000 of a device 1005 that supports reference signal security to combat eavesdropping and directional denial of service attacks in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reference signal security to combat eavesdropping and directional denial of service attacks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reference signal security to combat eavesdropping and directional denial of service attacks). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of reference signal security to combat eavesdropping and directional denial of service attacks as described herein. For example, the communications manager 1020 may include a reference signal parameter transmission component 1025 a reference signal receive component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The reference signal parameter transmission component 1025 may be configured as or otherwise support a means for transmitting, to a UE, an indication of the one or more parameters associated with a reference signal to be transmitted by the UE, the one or more parameters encoded separately from other communication parameters transmitted to the UE using a secret key that is known by the UE and the base station. The reference signal receive component 1030 may be configured as or otherwise support a means for receiving, from the UE, the reference signal in accordance with the one or more parameters.

Figure 11:
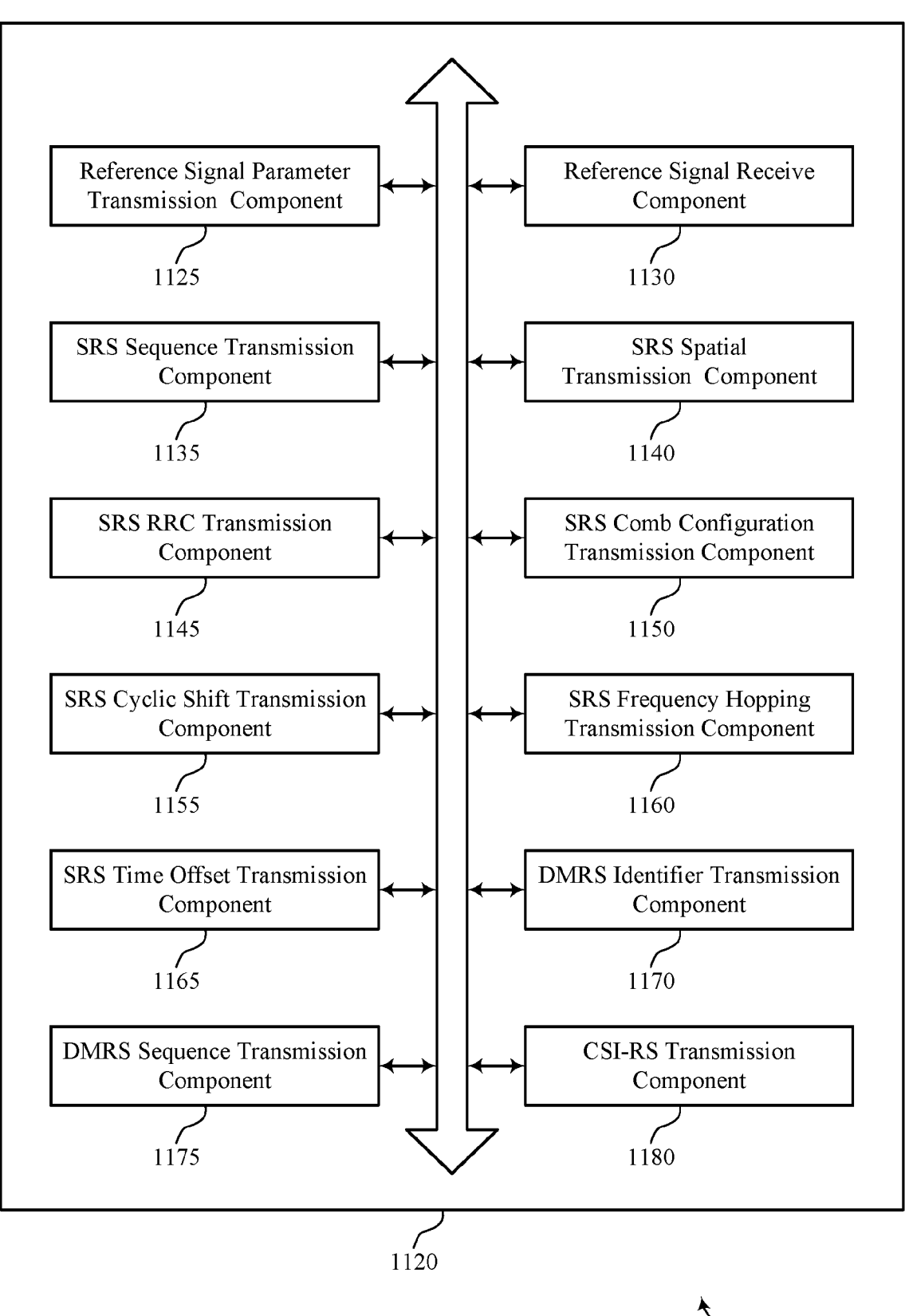
FIG. 11 shows a block diagram of a communications manager that supports reference signal security to combat eavesdropping and directional denial of service attacks in accordance with aspects of the present disclosure.

FIG. 11 shows a block diagram 1100 of a communications manager 1120 that supports reference signal security to combat eavesdropping and directional denial of service attacks in accordance with aspects of the present disclosure. The communications manager 1120 may be an example of aspects of a communications manager 920, a communications manager 1020, or both, as described herein. The communications manager 1120, or various components thereof, may be an example of means for performing various aspects of reference signal security to combat eavesdropping and directional denial of service attacks as described herein. For example, the communications manager 1120 may include a reference signal parameter transmission component 1125, a reference signal receive component 1130, an SRS sequence transmission component 1135, an SRS spatial transmission component 1140, an SRS RRC transmission component 1145, an SRS comb configuration transmission component 1150, an SRS cyclic shift transmission component 1155, an SRS frequency hopping transmission component 1160, an SRS time offset transmission component 1165, a DMRS identifier transmission component 1170, a DMRS sequence transmission component 1175, a CSI-RS transmission component 1180, or any combination thereof. Each of these components may communicate, directly or indirectly, with one another (e.g., via one or more buses).

The communications manager 1120 may support wireless communications at a base station or a second wireless device in accordance with examples as disclosed herein. The reference signal parameter transmission component 1125 may be configured as or otherwise support a means for transmitting, to a UE, an indication of the one or more parameters associated with a reference signal to be transmitted by the UE, the one or more parameters encoded separately from other communication parameters transmitted to the UE using a secret key that is known by the UE and the base station. The reference signal receive component 1130 may be configured as or otherwise support a means for receiving, from the UE, the reference signal in accordance with the one or more parameters.

In some examples, the reference signal includes a SRS, and the one or more parameters include a SRS sequence identifier secured using the secret key.

In some examples, the secret key is added to the SRS sequence identifier in a decimal domain or is added to a binary format of the SRS sequence identifier in a binary domain.

In some examples, the reference signal includes a SRS, and the one or more parameters include one or more spatial relation parameters secured using the secret key, the one or more spatial relation parameters being associated with a spatial relation between the SRS and one of a synchronization signal block, a broadcast channel block, a channel state information reference signal, or another SRS.

In some examples, the reference signal includes a SRS, and the one or more parameters include an indication of one or more RRC configurations that are at least partially secured using the secret key.

In some examples, each of the one or more RRC configurations include a bandwidth configuration parameter, a cyclic shift parameter, a SRS indexing configuration, a transmission comb configuration, or a combination thereof.

In some examples, the one or more RRC configurations include a false bandwidth configuration parameter, and application of the secret key to the false bandwidth configuration parameter yields a true bandwidth configuration parameter.

In some examples, the reference signal includes a SRS, and the one or more parameters include one or more comb level configurations combined with the secret key using an XOR operation.

In some examples, the one or more comb level configurations include at least a first comb configuration and a second comb configuration, and the first comb level configuration is secured using the secret key and applying the XOR operation to the first comb level configuration results in the second comb level configuration.

In some examples, the reference signal includes a SRS, and the one or more parameters include a real portion and an imaginary portion of a phase shifted sequence that are swapped based on the secret key.

In some examples, the reference signal includes a SRS, and the SRS sequence transmission component 1135 may be configured as or otherwise support a means for transmitting the one or more parameters of the SRS with the secret key, where the one or more parameters include an amplitude scaling factor secured based on the secret key.

In some examples, the reference signal includes a SRS, and the one or more parameters include a phase shift of a channel phase generated based on the secret key, the phase shift being a ramp in frequency, a set of random phases generated using the secret key, or both.

In some examples, the reference signal includes a SRS, and the one or more parameters include a cyclic shift for a set of multiple antenna ports based on the secret key.

In some examples, the cyclic shift is applied per antenna port of the set of multiple antenna ports based on the secret key.

In some examples, the reference signal includes a SRS, and the one or more parameters include a set of sequence identity parameters secured using the secret key.

In some examples, the set of sequence identity parameters include at least a first sequence identity parameters and a second sequence identity parameters, and the first sequence identity parameter is secured using the secret key and applying an XOR operation to the first sequence identity parameter results in the second sequence identity parameter.

In some examples, the reference signal includes a SRS, and the one or more parameters include a frequency hopping identification parameter secured using the secret key.

In some examples, the reference signal includes a SRS, and the SRS time offset transmission component 1165 may be configured as or otherwise support the one or more parameters including one or more time offset parameters secured using the secret key.

In some examples, the reference signal includes a SRS, and the SRS sequence transmission component 1135 may be configured as or otherwise support the one or more parameters including a set of one or more base sequence group numbers combined with the secret key using an XOR operation.

In some examples, the set of one or more base sequence group numbers include at least a first base sequence group number and a second base sequence group number, and the first base sequence group number is secured using the secret key and applying the XOR operation to the first base sequence group number results in the second base sequence group number.

In some examples, the reference signal includes a DMRS, and the DMRS identifier transmission component 1170 may be configured as or otherwise support the one or more parameters including a set of scrambling identifiers, a set of cell identifiers, or both, combined with the secret key using an XOR operation.

In some examples, the reference signal includes a DMRS, and the one or more parameters include an initialization value for generating a pseudorandom binary sequence secured using the secret key.

In some examples, the reference signal includes a DMRS, and the one or more parameters include a binary random variable or random noise added to a pseudorandom binary sequence secured using the secret key.

In some examples, the reference signal includes a DMRS, and the DMRS sequence transmission component 1175 may be configured as or otherwise support the one or more parameters including a generation function for a phase shifted sequence secured using the secret key.

In some examples, securing the generation function includes swapping a real portion of the generation function and an imaginary portion of the generation function in accordance with the secret key, multiplying the generation function based on the secret key, adding complex random values or random noise based on the secret key, or any combination thereof.

In some examples, the CSI-RS transmission component 1180 may be configured as or otherwise support a means for transmitting, to the UE, a channel state information reference signal, where at least a portion of the channel state information reference signal is secured based on a set of multiple associated spatial parameters secured using the secret key.

Figure 12:
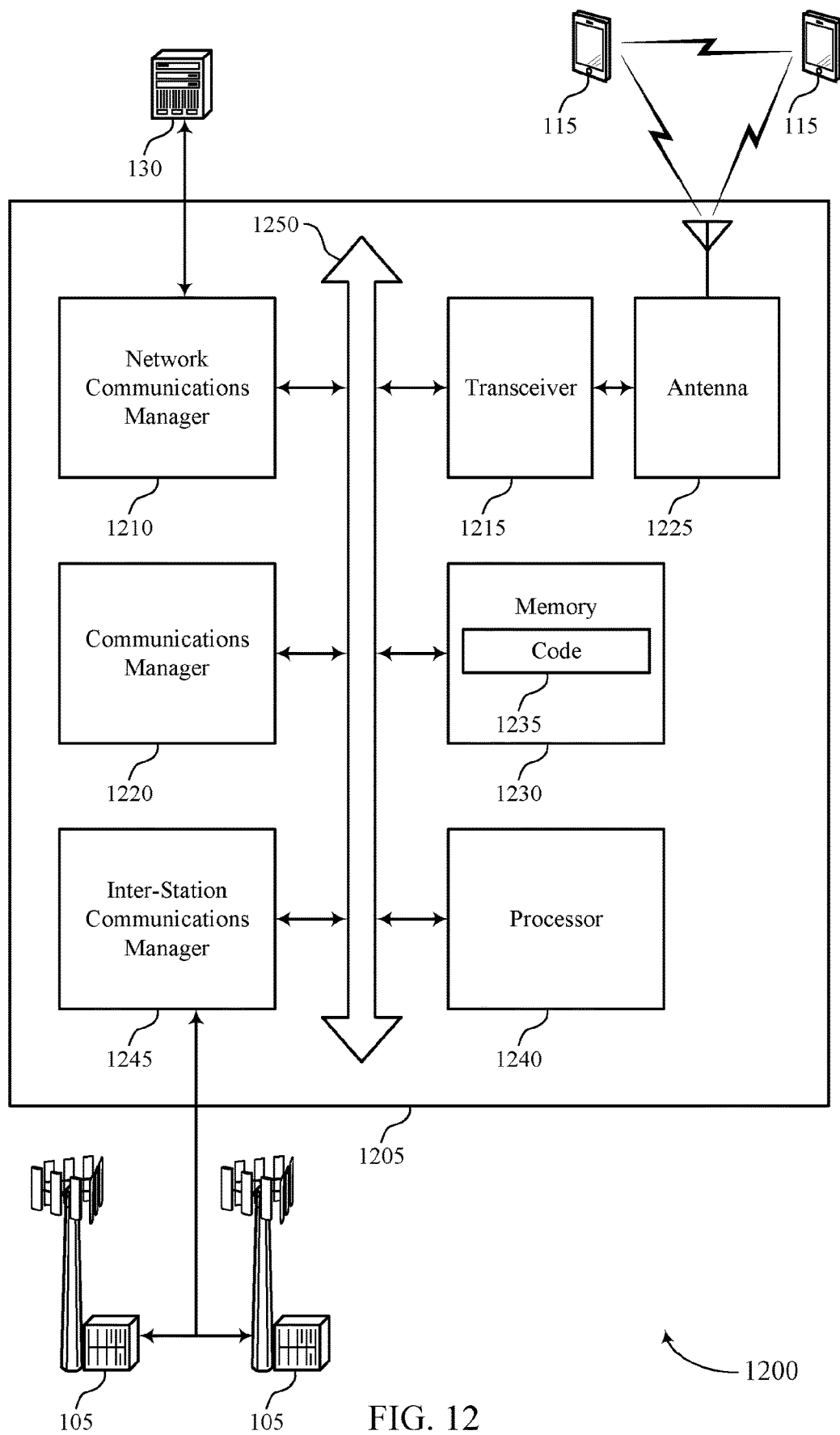
FIG. 12 shows a diagram of a system including a device that supports reference signal security to combat eavesdropping and directional denial of service attacks in accordance with aspects of the present disclosure.

FIG. 12 shows a diagram of a system 1200 including a device 1205 that supports reference signal security to combat eavesdropping and directional denial of service attacks in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reference signal security to combat eavesdropping and directional denial of service attacks). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, an indication of the one or more parameters associated with a reference signal to be transmitted by the UE, the one or more parameters encoded separately from other communication parameters transmitted to the UE using a secret key that is known by the UE and the base station. The communications manager 1220 may be configured as or otherwise support a means for receiving, from the UE, the reference signal in accordance with the one or more parameters.

By including or configuring the communications manager 1220 in accordance with examples as described herein, the device 1205 may support techniques for improved communication reliability, reduced latency, improved coordination between devices, and enhanced security of reference signaling. For example, the described techniques may allow for reduced success for DOS attacks thus increased reliability and security for communications in high-traffic networks.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of reference signal security to combat eavesdropping and directional denial of service attacks as described herein, or the processor 1240 and the memory 1230 may be otherwise configured to perform or support such operations.

FIG. 13 shows a flowchart illustrating a method 1300 that supports reference signal security to combat eavesdropping and directional denial of service attacks in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1305 may be performed in accordance with examples as disclosed herein. In some examples, aspects of the operations of 1305 may be performed by a reference signal parameter receive component 725 as described with reference to FIG. 7.

At 1310, the method may include decoding the one or more parameters associated with the reference signal using the secret key. The operations of 1310 may be performed in accordance with examples as disclosed herein. In some examples, aspects of the operations of 1310 may be performed by a secret key decoding component 730 as described with reference to FIG. 7.

At 1315, the method may include transmitting, to the base station, the reference signal in accordance with the one or more parameters. The operations of 1315 may be performed in accordance with examples as disclosed herein. In some examples, aspects of the operations of 1315 may be performed by a reference signal transmission component 735 as described with reference to FIG. 7.

FIG. 14 shows a flowchart illustrating a method 1400 that supports reference signal security to combat eavesdropping and directional denial of service attacks in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1405 may be performed in accordance with examples as disclosed herein. In some examples, aspects of the operations of 1405 may be performed by a reference signal parameter receive component 725 as described with reference to FIG. 7.

At 1410, the method may include decoding the one or more parameters associated with the reference signal using the secret key. The operations of 1410 may be performed in accordance with examples as disclosed herein. In some examples, aspects of the operations of 1410 may be performed by a secret key decoding component 730 as described with reference to FIG. 7.

At 1415, the one or more parameters include an indication of one or more RRC configurations that are at least partially secured using the secret key. The operations of 1415 may be performed in accordance with examples as disclosed herein. In some examples, aspects of the operations of 1415 may be performed by an SRS RRC decoding component 750 as described with reference to FIG. 7.

At 1420, the method may include transmitting, to the second wireless device, the reference signal in accordance with the one or more parameters. The operations of 1420 may be performed in accordance with examples as disclosed herein. In some examples, aspects of the operations of 1420 may be performed by a reference signal transmission component 735 as described with reference to FIG. 7.

FIG. 15 shows a flowchart illustrating a method 1500 that supports reference signal security to combat eavesdropping and directional denial of service attacks in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1505 may be performed in accordance with examples as disclosed herein. In some examples, aspects of the operations of 1505 may be performed by a reference signal parameter receive component 725 as described with reference to FIG. 7.

At 1510, the method may include decoding the one or more parameters associated with the reference signal using the secret key. The operations of 1510 may be performed in accordance with examples as disclosed herein. In some examples, aspects of the operations of 1510 may be performed by a secret key decoding component 730 as described with reference to FIG. 7.

At 1515, the one or more parameters may include one or more comb level configurations combined with the secret key using an XOR operation. The operations of 1515 may be performed in accordance with examples as disclosed herein. In some examples, aspects of the operations of 1515 may be performed by an SRS comb configuration decoding component 755 as described with reference to FIG. 7.

At 1520, the method may include transmitting, to the base station, the reference signal in accordance with the one or more parameters. The operations of 1520 may be performed in accordance with examples as disclosed herein. In some examples, aspects of the operations of 1520 may be performed by a reference signal transmission component 735 as described with reference to FIG. 7.

FIG. 16 shows a flowchart illustrating a method 1600 that supports reference signal security to combat eavesdropping and directional denial of service attacks in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1605 may be performed in accordance with examples as disclosed herein. In some examples, aspects of the operations of 1605 may be performed by a reference signal parameter receive component 725 as described with reference to FIG. 7.

At 1610, the method may include decoding the one or more parameters associated with the reference signal using the secret key. The operations of 1610 may be performed in accordance with examples as disclosed herein. In some examples, aspects of the operations of 1610 may be performed by a secret key decoding component 730 as described with reference to FIG. 7.

At 1615, the one or more parameters include a real portion and an imaginary portion of a phase shifted sequence. The operations of 1615 may be performed in accordance with examples as disclosed herein. In some examples, aspects of the operations of 1615 may be performed by an SRS sequence decoding component 740 as described with reference to FIG. 7.

At 1620, the method may include swapping the real portion and the imaginary portion in accordance with the secret key. The operations of 1620 may be performed in accordance with examples as disclosed herein. In some examples, aspects of the operations of 1620 may be performed by an SRS sequence decoding component 740 as described with reference to FIG. 7.

At 1625, the method may include transmitting, to the base station, the reference signal in accordance with the one or more parameters. The operations of 1625 may be performed in accordance with examples as disclosed herein. In some examples, aspects of the operations of 1625 may be performed by a reference signal transmission component 735 as described with reference to FIG. 7.

FIG. 17 shows a flowchart illustrating a method 1700 that supports reference signal security to combat eavesdropping and directional denial of service attacks in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1705 may be performed in accordance with examples as disclosed herein. In some examples, aspects of the operations of 1705 may be performed by a reference signal parameter receive component 725 as described with reference to FIG. 7.

At 1710, the method may include decoding the one or more parameters associated with the reference signal using the secret key. The operations of 1710 may be performed in accordance with examples as disclosed herein. In some examples, aspects of the operations of 1710 may be performed by a secret key decoding component 730 as described with reference to FIG. 7.

At 1715, the one or more parameters include a cyclic shift for a set of multiple antenna ports based on the secret key. The operations of 1715 may be performed in accordance with examples as disclosed herein. In some examples, aspects of the operations of 1715 may be performed by an SRS cyclic shift decoding component 760 as described with reference to FIG. 7.

At 1720, the method may include transmitting, to the base station, the reference signal in accordance with the one or more parameters. The operations of 1720 may be performed in accordance with examples as disclosed herein. In some examples, aspects of the operations of 1720 may be performed by a reference signal transmission component 735 as described with reference to FIG. 7.

FIG. 18 shows a flowchart illustrating a method 1800 that supports reference signal security to combat eavesdropping and directional denial of service attacks in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1805 may be performed in accordance with examples as disclosed herein. In some examples, aspects of the operations of 1805 may be performed by a reference signal parameter receive component 725 as described with reference to FIG. 7.

At 1810, the method may include decoding the one or more parameters associated with the reference signal using the secret key. The operations of 1810 may be performed in accordance with examples as disclosed herein. In some examples, aspects of the operations of 1810 may be performed by a secret key decoding component 730 as described with reference to FIG. 7.

At 1815, the method may include decoding the one or more parameters of the DMRS using the secret key, where the one or more parameters include a set of scrambling identifiers, a set of cell identifiers, or both, combined with the secret key using an XOR operation. The operations of 1815 may be performed in accordance with examples as disclosed herein. In some examples, aspects of the operations of 1815 may be performed by a DMRS identifier decoding component 775 as described with reference to FIG. 7.

At 1820, the method may include transmitting, to the base station, the reference signal in accordance with the one or more parameters. The operations of 1820 may be performed in accordance with examples as disclosed herein. In some examples, aspects of the operations of 1820 may be performed by a reference signal transmission component 735 as described with reference to FIG. 7.

FIG. 19 shows a flowchart illustrating a method 1900 that supports reference signal security to combat eavesdropping and directional denial of service attacks in accordance with aspects of the present disclosure. The operations of the method 1900 may be implemented by a UE or its components as described herein. For example, the operations of the method 1900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, an indication of one or more parameters associated with a reference signal to be transmitted by the UE, the one or more parameters encoded separately from other communication parameters received from the base station using a secret key that is known by the UE and the base station. The operations of 1905 may be performed in accordance with examples as disclosed herein. In some examples, aspects of the operations of 1905 may be performed by a reference signal parameter receive component 725 as described with reference to FIG. 7.

At 1910, the method may include decoding the one or more parameters associated with the reference signal using the secret key. The operations of 1910 may be performed in accordance with examples as disclosed herein. In some examples, aspects of the operations of 1910 may be performed by a secret key decoding component 730 as described with reference to FIG. 7.

At 1915, the one or more parameters include a binary random variable or random noise added to a pseudorandom binary sequence secured using the secret key. The operations of 1915 may be performed in accordance with examples as disclosed herein. In some examples, aspects of the operations of 1915 may be performed by a DMRS sequence decoding component 780 as described with reference to FIG. 7.

At 1920, the method may include transmitting, to the base station, the reference signal in accordance with the one or more parameters. The operations of 1920 may be performed in accordance with examples as disclosed herein. In some examples, aspects of the operations of 1920 may be performed by a reference signal transmission component 735 as described with reference to FIG. 7.

FIG. 20 shows a flowchart illustrating a method 2000 that supports reference signal security to combat eavesdropping and directional denial of service attacks in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, an indication of the one or more parameters associated with a reference signal to be transmitted by the UE, the one or more parameters encoded separately from other communication parameters transmitted to the UE using a secret key that is known by the UE and the base station. The operations of 2005 may be performed in accordance with examples as disclosed herein. In some examples, aspects of the operations of 2005 may be performed by a reference signal parameter transmission component 1125 as described with reference to FIG. 11.

At 2010, the method may include receiving, from the UE, the reference signal in accordance with the one or more parameters. The operations of 2010 may be performed in accordance with examples as disclosed herein. In some examples, aspects of the operations of 2010 may be performed by a reference signal receive component 1130 as described with reference to FIG. 11.

The following provides an overview of aspects of the present disclosure:

Aspect 1: A method for wireless communications at a first wireless device, comprising: receiving, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device; decoding the one or more parameters associated with the reference signal using the secret key; and transmitting, to the second wireless device, the reference signal in accordance with the one or more parameters.

Aspect 2: The method of aspect 1, wherein the reference signal comprises a SRS and the one or more parameters comprise a SRS sequence identifier secured using the secret key.

Aspect 3: The method of aspect 2, wherein the secret key is added to the SRS sequence identifier in a decimal domain or is added to a binary format of the SRS sequence identifier in a binary domain.

Aspect 4: The method of any of aspects 1 through 3, wherein the reference signal comprises a SRS, and the one or more parameters comprise one or more spatial relation parameters secured using the secret key, the one or more spatial relation parameters being associated with a spatial relation between the SRS and one of a synchronization signal block, a broadcast channel block, a channel state information reference signal, or another SRS.

Aspect 5: The method of any of aspects 1 through 4, wherein the reference signal comprises a SRS, and the one or more parameters comprise an indication of one or more RRC configurations that are at least partially secured using the secret key.

Aspect 6: The method of aspect 5, wherein each of the one or more RRC configurations comprise a bandwidth configuration parameter, a cyclic shift parameter, a SRS indexing configuration, a transmission comb configuration, or a combination thereof.

Aspect 7: The method of any of aspects 5 through 6, wherein the one or more RRC configurations comprise a false bandwidth configuration parameter, and application of the secret key to the false bandwidth configuration parameter results yields a true bandwidth configuration parameter.

Aspect 8: The method of any of aspects 1 through 7, wherein the reference signal comprises a SRS and the one or more parameters comprise one or more comb level configurations combined with the secret key using an XOR operation.

Aspect 9: The method of aspect 8, wherein the one or more comb level configurations comprise at least a first comb configuration and a second comb configuration, and the first comb level configuration is secured using the secret key and applying the XOR operation to the first comb level configuration results in the second comb level configuration.

Aspect 10: The method of any of aspects 1 through 9, wherein the reference signal comprises a SRS, and the one or more parameters comprise a real portion and an imaginary portion of a phase shifted sequence; and swapping the real portion and the imaginary portion in accordance with the secret key.

Aspect 11: The method of any of aspects 1 through 10, wherein the reference signal comprises a SRS, and the one or more parameters comprise an amplitude scaling factor secured at least in part on the secret key.

Aspect 12: The method of any of aspects 1 through 11, wherein the reference signal comprises a SRS, and the one or more parameters comprise a phase shift of a channel phase generated based at least in part on the secret key, the phase shift being a ramp in frequency, a set of random phases generated using the secret key, or both.

Aspect 13: The method of any of aspects 1 through 12, wherein the reference signal comprises a SRS, and the one or more parameters comprise a cyclic shift for a plurality of antenna ports based at least in part on the secret key.

Aspect 14: The method of aspect 13, wherein the cyclic shift is applied per antenna port of the plurality of antenna ports based at least in part on the secret key.

Aspect 15: The method of any of aspects 1 through 14, wherein the reference signal comprises a SRS, and the one or more parameters comprise a set of sequence identity parameters secured using the secret key.

Aspect 16: The method of aspect 15, wherein the set of sequence identity parameters comprise at least a first sequence identity parameters and a second sequence identity parameters, and the first sequence identity parameter is secured using the secret key and applying an XOR operation to the first sequence identity parameter results in the second sequence identity parameter.

Aspect 17: The method of any of aspects 1 through 16, wherein the reference signal comprises a SRS, and the one or more parameters comprise a frequency hopping identification parameter secured using the secret key.

Aspect 18: The method of any of aspects 1 through 17, wherein the reference signal comprises a SRS and the one or more parameters comprise one or more time offset parameters secured using the secret key.

Aspect 19: The method of any of aspects 1 through 18, wherein the reference signal comprises a SRS, and the one or more parameters comprise a set of one or more base sequence group numbers combined with the secret key using an XOR operation.

Aspect 20: The method of aspect 19, wherein the set of one or more base sequence group numbers comprise at least a first base sequence group number and a second base sequence group number, where the first base sequence group number is secured using the secret key and where applying the XOR operation to the first base sequence group number results in the second base sequence group number.

Aspect 21: The method of any of aspects 1 through 20, wherein the reference signal comprises a DMRS, and the one or more parameters comprise a set of scrambling identifiers, a set of cell identifiers, or both, combined with the secret key using an XOR operation.

Aspect 22: The method of any of aspects 1 through 21, wherein the reference signal comprises a DMRS, and the one or more parameters comprise an initialization value for generating a pseudorandom binary sequence secured using the secret key.

Aspect 23: The method of any of aspects 1 through 22, wherein the reference signal comprises a DMRS, and the one or more parameters comprise a binary random variable or random noise added to a pseudorandom binary sequence secured using the secret key.

Aspect 24: The method of any of aspects 1 through 23, wherein the reference signal comprises a DMRS, and the one or more parameters comprise a generation function for a phase shifted sequence secured using the secret key.

Aspect 25: The method of aspect 24, wherein securing the generation function comprises swapping a real portion of the generation function and an imaginary portion of the generation function in accordance with the secret key, multiplying the generation function based at least in part on the secret key, adding complex random values or random noise based at least in part on the secret key, or any combination thereof.

Aspect 26: The method of any of aspects 1 through 25, further comprising: receiving, from the second wireless device, a CSI-RS that is secured using the secret key; decoding the CSI-RS in accordance with the secret key; and performing one or more channel state information measurements based at least in part on the decoding of the secured CSI-RS.

Aspect 27: A method for wireless communications at a second wireless device, comprising: transmitting, to a first wireless device, an indication of the one or more parameters associated with a reference signal to be transmitted by the first wireless device, the one or more parameters encoded separately from other communication parameters transmitted to the first wireless device using a secret key that is known by the first wireless device and the second wireless device; and receiving, from the first wireless device, the reference signal in accordance with the one or more parameters.

Aspect 28: The method of aspect 27, further comprising: transmitting, to the first wireless device, a channel state information reference signal, wherein at least a portion of the channel state information reference signal is secured based at least in part on a plurality of associated spatial parameters secured using the secret key.

Aspect 29: An apparatus for wireless communications at a first wireless device, comprising a processor; memory coupled with the processor; and instructions stored in the memory and executable by the processor to cause the apparatus to perform a method of any of aspects 1 through 26.

Aspect 30: An apparatus for wireless communications at a first wireless device, comprising at least one means for performing a method of any of aspects 1 through 26.

Aspect 31: A non-transitory computer-readable medium storing code for wireless communications at a first wireless device, the code comprising instructions executable by a processor to perform a method of any of aspects 1 through 26.

Aspect 32: An apparatus for wireless communications at a second wireless device, comprising a processor; memory coupled with the processor; and instructions stored in the memory and executable by the processor to cause the apparatus to perform a method of any of aspects 27 through 28.

Aspect 33: An apparatus for wireless communications at a second wireless device, comprising at least one means for performing a method of any of aspects 27 through 28.

Aspect 34: A non-transitory computer-readable medium storing code for wireless communications at a second wireless device, the code comprising instructions executable by a processor to perform a method of any of aspects 27 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

receiving, from a second wireless device, an indication of one or more parameters associated with a reference signal to be transmitted by the first wireless device, the one or more parameters encoded separately from other communication parameters received from the second wireless device using a secret key that is known by the first wireless device and the second wireless device;

decoding the one or more parameters associated with the reference signal using the secret key; and transmitting, to the second wireless device, the reference signal in accordance with the one or more parameters.

2. The method of claim 1, wherein the reference signal comprises a sounding reference signal and the one or more parameters comprise a sounding reference signal sequence identifier secured using the secret key.

3. The method of claim 2, wherein the secret key is added to the sounding reference signal sequence identifier in a decimal domain or is added to a binary format of the sounding reference signal sequence identifier in a binary domain.

4. The method of claim 1, wherein the reference signal comprises a sounding reference signal and the one or more parameters comprise one or more spatial relation parameters secured using the secret key, the one or more spatial relation parameters being associated with a spatial relation between the sounding reference signal and one of a synchronization signal block, a broadcast channel block, a channel state information reference signal, or another sounding reference signal.

5. The method of claim 1, wherein the reference signal comprises a sounding reference signal and the one or more parameters comprise an indication of one or more radio resource control configurations that are at least partially secured using the secret key.

6. The method of claim 5, wherein each of the one or more radio resource control configurations comprise a bandwidth configuration parameter, a cyclic shift parameter, a sounding reference signal indexing configuration, a transmission comb configuration, or a combination thereof.

7. The method of claim 5, wherein the one or more radio resource control configurations comprise a false bandwidth configuration parameter, and application of the secret key to the false bandwidth configuration parameter yields a true bandwidth configuration parameter.

8. The method of claim 1, wherein the reference signal comprises a sounding reference signal and the one or more parameters comprise one or more comb level configurations combined with the secret key using an exclusive OR operation.

9. The method of claim 8, wherein the one or more comb level configurations comprise at least a first comb level configuration and a second comb level configuration, and the first comb level configuration is secured using the secret key and applying the exclusive OR operation to the first comb level configuration results in the second comb level configuration.

10. The method of claim 1, wherein the reference signal comprises a sounding reference signal and the one or more parameters comprise a real portion and an imaginary portion of a phase shifted sequence; the method further comprising:

swapping the real portion and the imaginary portion in accordance with the secret key.

11. The method of claim 1, wherein the reference signal comprises a sounding reference signal and the one or more parameters comprise an amplitude scaling factor secured based at least in part on the secret key.

12. The method of claim 1, wherein the reference signal comprises a sounding reference signal and the one or more parameters comprise a phase shift of a channel phase generated based at least in part on the secret key, the phase shift being a ramp in frequency, a set of random phases generated using the secret key, or both.

13. The method of claim 1, wherein the reference signal comprises a sounding reference signal and the one or more parameters comprise a cyclic shift for a plurality of antenna ports based at least in part on the secret key, wherein the cyclic shift is applied per antenna port of the plurality of antenna ports based at least in part on the secret key.

14. The method of claim 1, wherein the reference signal comprises a sounding reference signal and the one or more parameters comprise a set of sequence identity parameters secured using the secret key, the set of sequence identity parameters including at least a first sequence identity parameter and a second sequence identity parameter, wherein the first sequence identity parameter is secured using the secret key, and wherein applying an exclusive OR operation to the first sequence identity parameter results in the second sequence identity parameter.

15. The method of claim 1, wherein the reference signal comprises a sounding reference signal and the one or more parameters comprise a frequency hopping identification parameter secured using the secret key.

16. The method of claim 1, wherein the reference signal comprises a sounding reference signal and the one or more parameters comprise one or more time offset parameters secured using the secret key.

17. The method of claim 1, wherein the reference signal comprises a sounding reference signal and the one or more parameters comprise a set of one or more base sequence group numbers combined with the secret key using an exclusive OR operation.

18. The method of claim 17, wherein the set of one or more base sequence group numbers comprise at least a first base sequence group number and a second base sequence group number, wherein the first base sequence group number is secured using the secret key, and wherein applying the exclusive OR operation to the first base sequence group number results in the second base sequence group number.

19. The method of claim 1, wherein the reference signal comprises a demodulation reference signal and the one or more parameters comprise a set of scrambling identifiers, a set of cell identifiers, or both, combined with the secret key using an exclusive OR operation.

20. The method of claim 1, wherein the reference signal comprises a demodulation reference signal and the one or more parameters comprise an initialization value for generating a pseudorandom binary sequence secured using the secret key.

21. The method of claim 1, wherein the one or more parameters comprise a binary random variable or random noise added to a pseudorandom binary sequence secured using the secret key.

22. The method of claim 1, wherein the reference signal comprises a demodulation reference signal and the one or more parameters comprise a generation function for a phase shifted sequence secured using the secret key by swapping a real portion of the generation function and an imaginary portion of the generation function in accordance with the secret key, multiplying the generation function based at least in part on the secret key, adding complex random values or random noise based at least in part on the secret key, or any combination thereof.

23. The method of claim 1, further comprising:

receiving, from the second wireless device, a channel state information reference signal that is secured using the secret key;

decoding the channel state information reference signal in accordance with the secret key; and performing one or more channel state information measurements based at least in part on the decoding of the secured channel state information reference signal.

24. A method for wireless communications at a second wireless device, comprising:

encoding one or more parameters associated with a reference signal using a secret key that is known by a first wireless device and the second wireless device;

transmitting, to the first wireless device, an indication of the one or more parameters associated with the reference signal to be transmitted by the first wireless device, the one or more parameters encoded separately from other communication parameters transmitted to the first wireless device; and receiving, from the first wireless device, the reference signal in accordance with the one or more parameters.

25. An apparatus for wireless communications, comprising:

one or more processors;

one or more memories coupled with the one or more processors; and instructions stored in the one or more memories and executable by the one or more processors to cause the apparatus to:

receive, from a second wireless device, a control message that includes an indication of one or more parameters associated with a reference signal to be transmitted by a first wireless device, the one or more parameters encoded separately from other communication parameters received from the second wireless device using a secret key that is known by the first wireless device and the second wireless device;

decode the one or more parameters associated with the reference signal using the secret key; and transmit, to the second wireless device, the reference signal in accordance with the one or more parameters.

26. The apparatus of claim 25, wherein the reference signal comprises a sounding reference signal and the one or more parameters comprise a sounding reference signal sequence identifier secured using the secret key.

27. The apparatus of claim 25, wherein the reference signal comprises a sounding reference signal and the one or more parameters comprise one or more spatial relation parameters secured using the secret key, the one or more spatial relation parameters being associated with a spatial relation between the sounding reference signal and one of a synchronization signal block, a broadcast channel block, a channel state information reference signal, or another sounding reference signal.

28. The apparatus of claim 25, wherein the reference signal comprises a demodulation reference signal and the one or more parameters comprise a set of scrambling identifiers, a set of cell identifiers, or both, combined with the secret key using an exclusive OR operation.

29. The apparatus of claim 25, wherein the instructions are further executable by the one or more processors to cause the apparatus to:

receive, from the second wireless device, a channel state information reference signal that is secured using the secret key;

decode the channel state information reference signal in accordance with the secret key; and perform one or more channel state information measurements based at least in part on the decoding of the secured channel state information reference signal.

30. An apparatus for wireless communications, comprising:

one or more processors;

one or more memories coupled with the one or more processors; and instructions stored in the one or more memories and executable by the one or more processors to cause the apparatus to:

encode one or more parameters associated with a reference signal using a secret key that is known by a first wireless device and a second wireless device;

transmit, to the first wireless device, an indication of the one or more parameters associated with the reference signal to be transmitted by the first wireless device, the one or more parameters encoded separately from other communication parameters transmitted to the first wireless device; and receive, from the first wireless device, the reference signal in accordance with the one or more parameters.

* * * * *